United States Patent [19]
Diduck

[11] Patent Number: 6,025,788
[45] Date of Patent: Feb. 15, 2000

[54] INTEGRATED LOCAL OR REMOTE CONTROL LIQUID GAS LEAK DETECTION AND SHUT-OFF SYSTEM

[75] Inventor: Victor John Diduck, Kamloops, Canada

[73] Assignee: First Smart Sensor Corp.

[21] Appl. No.: 08/602,300

[22] Filed: Feb. 16, 1996

[30] Foreign Application Priority Data

Nov. 24, 1995 [CA] Canada ................................. 2163696

[51] Int. Cl.[7] .................................................. G08B 21/00
[52] U.S. Cl. .......................... 340/870.16; 340/825.06; 340/605; 340/539
[58] Field of Search .................. 340/870.16, 870.11, 340/870.15, 825.06, 825.16, 539, 604, 605, 632, 501

[56] References Cited

U.S. PATENT DOCUMENTS

| | | |
|---|---|---|
| 3,757,317 | 9/1973 | Kahn et al. . |
| 4,024,887 | 5/1977 | McGregor . |
| 4,134,022 | 1/1979 | Jacobsen . |
| 4,248,087 | 2/1981 | Dennis et al. . |
| 4,437,497 | 3/1984 | Enander . |
| 4,715,398 | 12/1987 | Shouldice et al. . |
| 4,736,763 | 4/1988 | Britton et al. . |
| 5,190,069 | 3/1993 | Richards .................. 340/605 |
| 5,240,022 | 8/1993 | Franklin . |
| 5,334,973 | 8/1994 | Furr ........................ 340/605 |

*Primary Examiner*—Michael Horabik
*Assistant Examiner*—Albert K. Wong
*Attorney, Agent, or Firm*—Antony C. Edwards

[57] ABSTRACT

A novel system for detecting liquid and/or gas leaks and automatically shutting off the source of the liquid and/or gas leak. The system includes electronically detecting undesirable liquid and/or gas leaks, electronically transmitting signal about such undesirable liquid and/or gas leak, electronically receiving the signal, and electronically activating a mechanism which shuts off a liquid and/or gas valve thereby stopping the liquid or gas leak.

6 Claims, 20 Drawing Sheets

FIG. II

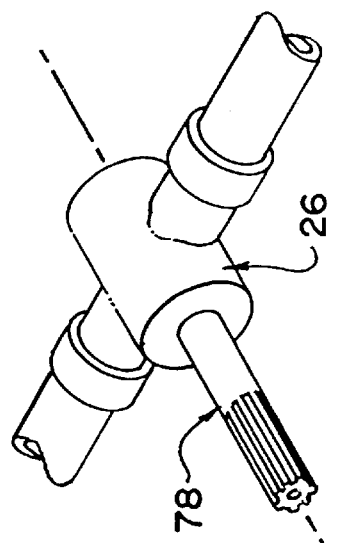
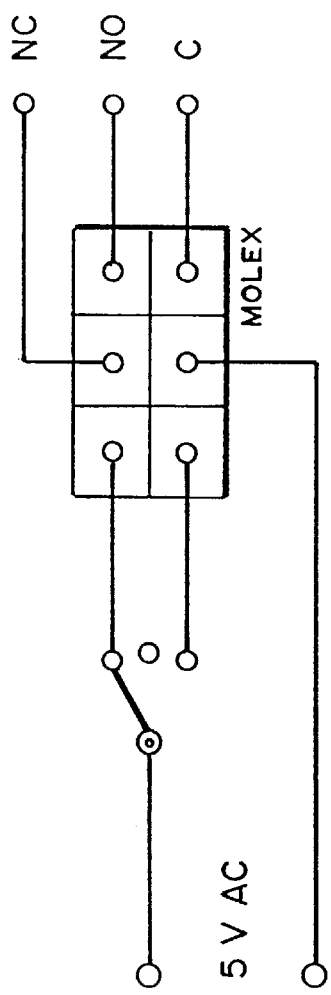
FIG. 12
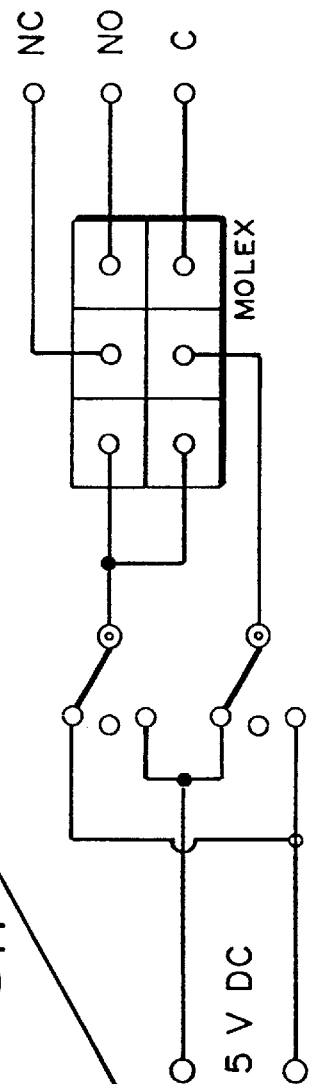
FIG. 15
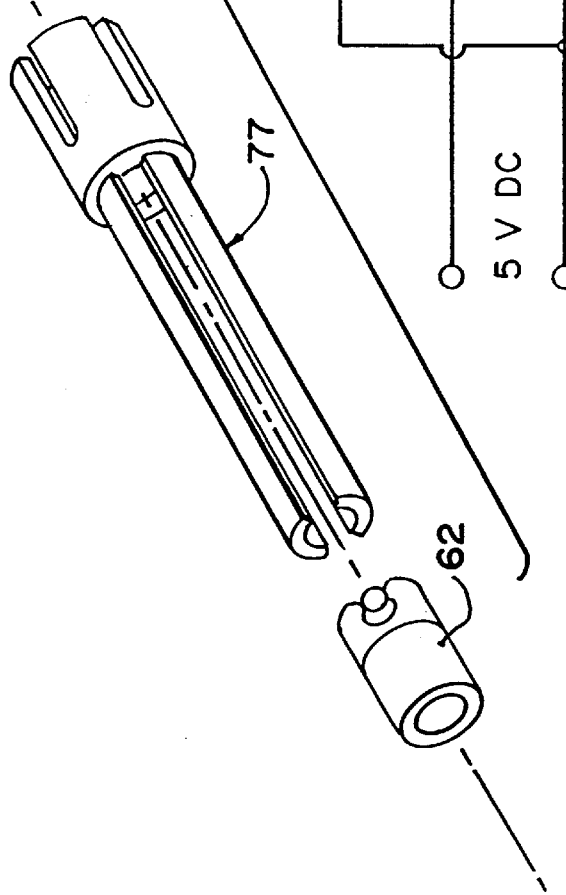
FIG. 14

INTEGRATED LOCAL OR REMOTE CONTROL LIQUID GAS LEAK DETECTION AND SHUT-OFF SYSTEM

FIELD OF THE INVENTION

This invention relates to a novel integrated local or remotely operated system for detecting liquid and/or gas leaks and automatically by local or remote control shutting off the source of the liquid or gas leak. More particularly, this invention pertains to a novel integrated local or remotely operated single or network system for electronically detecting undesirable liquid and/or gas leaks, electronically transmitting by hardwire or remote transmission an alarm signalling such undesirable liquid and/or gas leak to a local or remote control source, electronically receiving the alarm at the local or remote control source, and electronically activating by hardwire or radio or infrared system a mechanism which shuts off a liquid or gas valve to the leak source thereby stopping the undesirable liquid and/or gas leak.

BACKGROUND OF THE INVENTION

Most residential buildings, hotels, office buildings, and the like, in the industrialized areas of the world, are serviced by water and/or natural gas, oil or propane. These services involve pipes, valves, and other mechanized devices for conveying the liquids and/or gases and require periodic maintenance. Not infrequently, there is a malfunction and undesirable water or gas leaks into the building, thereby causing costly unwanted damage and creating a safety hazard. In buildings which are heated, there is a constant danger that lethal carbon monoxide will be generated from improper combustion of the fuel source. Insurance companies insuring buildings or occupants which are affected by unwanted water or gas leaks annually pay out large compensation for such unwanted water or gas damage.

There is a strong need for an automatic locally or remotely operated system which can be installed in single or multiple residential buildings or commercial buildings and can automatically detect undesirable water or gas leakage, and automatically shut off the source of such unwanted liquid or gas leakage, until the source of the leakage can be repaired. Insurance rates would be reduced if the risk of potential damage was minimized. Building owners would be more comfortable with the reduced risk of accidental liquid or gas damage, and in the case of leaking or noxious gases, alerted as to their safety.

The following patents disclose apparatus or systems which may be pertinent to the subject matter of this application.

| U.S. Pat. No. | Owner |
| --- | --- |
| 3,757,317 | U.S. Dynasty Corp. |
| 4,024,887 | Vought Corp. |
| 4,134,022 | Honeywell U.S.A. |
| 4,248,087 | Haliburton Company |
| 4,437,497 | Enander |
| 4,715,398 | Co Be La B's Inc. |
| 4,736,763 | Britton |
| 5,240,022 | Franklin |

U.S. Pat. No. 4,134,022, Honeywell, U.S.A., discloses a liquid level sensing apparatus that has a source for supplying a signal of a predetermined frequency. A level sensor is connected to the source and has an output for signalling an output signal which has the predetermined frequency, so long as the level of the material being sensed is not at a predetermined level. The apparatus includes a frequency sensitive circuit for receiving the output signal from the level sensor and for providing an output whenever the frequency of the signal is above or below the predetermined frequency. A load which is responsive to the output from the frequency sensitive circuit is connected to the circuit. This patent does not disclose an integrated local or remotely operated system for detecting liquid and gas leaks and automatically shutting off the source of the liquid or gas leak.

U.S. Pat. No. 5,240,022, Franklin, discloses an automatic shut-off valve system for installation, for instance, in the water supply line to a hot water heater and includes a sensor to detect leakage electrically by sensing moisture, and then shutting off the supply line in response. The valve mechanism includes a spring loaded ball valve normally latched in the open position which is unlatched and hence closes by the contraction of a BioMetal (trade-mark) wire which activates a torsion spring to rotate the ball valve. The valve is controlled by a microprocessor which includes self test features, and the valve system may operate for a year or more on battery power. This patent does not disclose gas sensors or application of the system to multiple unit buildings or networked systems.

SUMMARY OF THE INVENTION

The apparatus and system of the invention is a locally operated, or remotely operated single, multiple, or networked system which can detect unwanted liquid and/or gas leaks and by local or remote communication shut off the liquid and/or gas valve that is the source of the liquid or gas leak. The apparatus and system of the invention has the capability of changing or stopping the flow rate and/or flow direction and/or pressure of liquids and/or gases by detecting the presence or absence of liquids and/or gases, for example, in residential buildings, apartment buildings, hotels, office buildings, and the like. The apparatus and system of the invention can be installed in a single dwelling, a multiple residency-type building, a commercial building or a small or large group of buildings of various types such as towns or cities. The apparatus and method of the invention apply to liquids such as water or fuel oil, and gases, for example, natural gas, carbon monoxide, propane or other gases.

The invention is directed to a liquid or gas detection and control apparatus comprising: (a) a liquid or gas detector (sensor) for detecting liquid or gas; (b) a means of transmitting an output signal from the liquid or gas detector, said transmission, when activated by the liquid or gas detector detecting liquid or gas, transmitting audio, radio, electronic or electrical signals to a receiver; (c) a receiver and control for receiving and acting on audio, radio, electronic or electrical signals transmitted by the transmitter; (d) a mechanism associated with the receiver and control, the mechanism when commanded by the receiver and control being activated to change the flow rate and/or flow direction and/or pressure by means of an electro-mechanical device placed at the source of the liquid and/or gas; and (e) a power supply for electrically powering the detector, transmitter, receiver and mechanism.

The invention in another embodiment is directed to a liquid and gas leak detection and control apparatus comprising: (a) a liquid detector for detecting liquid; (b) a gas detector for detecting gas; (c) at least one transmitter electronically associated with the liquid and gas detectors; said transmitter, when activated by an electronic signal by the liquid or gas detector detecting liquid or gas, transmitting audio, radio or electrical signals to a receiver; (d) at least one receiver for receiving audio, radio or electronic signals transmitted by the transmitter and activating a control mechanism; (d) a control mechanism associated with the receiver, the control mechanism, when activated by an electronic signal from the receiver activating a shut off a valve which controls a source of the liquid or gas; and (e) a power supply for electrically powering the detector, transmitter, receiver and control mechanism.

The liquid detector can be an electrical water detector, which generates an electrical signal to the transmitter when water contacts the detector. The gas detector can generate an electrical signal to the transmitter when a specified gas contacts the gas detector. The transmitter can be electrically connected to the water detector and when the water detector is contacted by water, the transmitter can be electrically activated and transmit a high frequency radio signal to the receiver.

The control mechanism can be an electric motor and the receiver, which receives a radio signal from the transmitter, can electrically activate the electric motor which is connected to and shuts off a water valve which controls the source of the water. The transmitter and the receiver can be electrically powered by low voltage electrical current. The low voltage electrical current can be provided by a low voltage transformer which can be connected to a source of high voltage alternating electrical current.

The gas detector can be a natural gas detector, a carbon monoxide detector, or a propane detector and can be programmed to be activated by natural gas, carbon monoxide or propane above a predetermined threshold level. The control mechanism can be an electric motor and the receiver, when receiving a signal from the gas detector activated transmitter, can deliver an electrical signal to the motor, which is connected to and shuts off a valve which controls the source of the detected gas.

The detector in another form can be a water detector and can comprise an electrical wire, enclosed in electrical insulation, with one or more ports in the insulation which enable water to penetrate the insulation and contact the electrical wire. The liquid detector can include a second electrical wire enclosed in the insulation, with one or more ports in the insulation, which enable water to penetrate the electrical insulation and contact the electrical wire.

The motor can be a rotary electrical motor which is connected to the water valve by a series of gears and shafts which translate motor rotational force to valve closing or opening rotational force. The apparatus can include a maximum motor rotation limiting switch.

The transmitter can transmit radio signals of a specified frequency, and the receiver can receive and be activated by radio signals of the same specified frequency.

In one specific embodiment, the apparatus can include at least one water detector, at least one transmitter associated with the detector, at least one receiver associated with the water detector transmitter, at least one control mechanism which can be an electrically activated motor connected to a water shut-off valve, at least one gas detector, at least one transmitter associated with the gas detector, at least one receiver associated with the gas detector transmitter and at least one mechanism which can be an electrical motor connected to a valve controlling a gas source.

In another version, the apparatus can include a plurality of water detectors and a plurality of gas detectors located in separate locations and including a central control station which can electronically communicate with the water detectors, transmitters and receivers and control valves that regulate the sources of the water and the gas.

The apparatus can also include a plurality of water detectors deployed throughout a building, and a plurality of connecting transmitters deployed throughout the building, the transmitters communicating with respective receivers and motors, which can be connected to a plurality of respective water valves which respectively can be the source of water which may contact the respective water detectors, the respective motors shutting off applicable water valves.

The apparatus can include a plurality of gas detectors deployed throughout a building, and a plurality of connecting transmitters deployed throughout the building, the transmitters communicating with respective receivers and motors, which can be connected to a plurality of respective water valves which respectively can be the source of gas which may contact the respective gas detectors, the respective motors shutting off applicable gas valves.

DRAWINGS

In drawings which illustrate specific embodiments of the invention, but which should not be construed as restricting the spirit or scope of the invention in any way:

FIG. 12 illustrates a connector for a mechanical gear drive assembly.

FIG. 14 illustrates a circuit diagram of a five volt AC-DC floating control VC. actuator.

FIG. 15 illustrates an alternative circuit diagram of a five volt AC-DC floating control.

DETAILED DESCRIPTION OF THE PREFERRED EMBODIMENT

Figure 1:
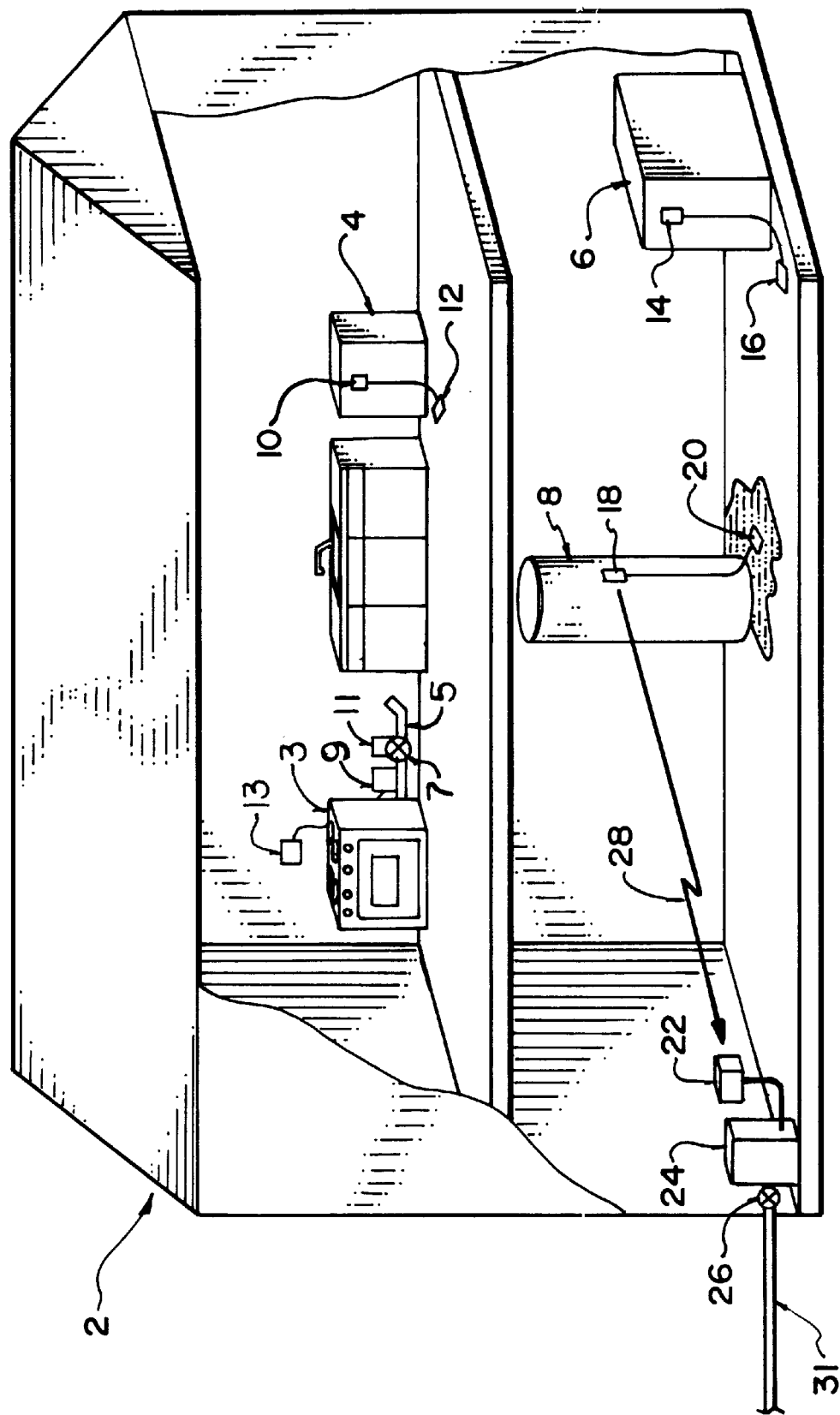
FIG. 1 illustrates an isometric view of a residential building equipped with various gas and water appliances and automatic water and gas shut-off systems according to the invention.

Referring to the drawings, FIG. 1 illustrates an isometric view of a residential building 2 equipped with various water and gas appliances and automatic water and gas shut-off systems according to the invention. The invention disclosed and claimed herein provides an automatic electronic means for automatically shutting off a leaking gas line or the main water supply to the house 2 in case a gas leak is detected from the stove 3, or a water leak is detected from any one of the appliances, and indeed from and any other source, if required. Specifically, FIG. 1 illustrates in isometric view a two storey residential house 2, equipped with a natural gas stove 3 and a dishwasher 4 on the second floor, and a clothes washer 6 and a hot water tank 8 on the first floor. The natural gas stove 3 is serviced by natural gas through gas line 5 and controlled by on-off valve 7. A potentially dangerous gas leak will be detected by natural gas sensor 9, which will then command an electric motor 11 to shut off valve 7. Likewise, a carbon monoxide sensor 13 is located proximate the stove 3 so if the natural gas is not burning efficiently in the stove, and carbon monoxide is generated, the sensor 13 will transmit an appropriate signal and shut off valve 7 will be closed.

Since each of the water consuming appliances 4, 6 and 8 is serviced by water, a break in the water line or a valve or a burst water seal, or some other defect or malfunction, in any one of the appliances can result in unwanted water damage, since the water being supplied to these appliances is under pressure, usually in the order of 40 to 60 psi.

As also seen in FIG. 1, the dishwasher 4 is equipped with a transmitter 10 and a water detector 12. Likewise, the clothes washer 6 is equipped with a transmitter 14 and a water detector 16. Similarly, the hot water tank 8 is equipped with a transmitter 18 and a water detector 20. If a water leak occurs at any of these three locations, then the respective detectors 12, 16 or 20, which generally are positioned at floor level, will detect the leak and electronically activate the respective transmitters 10, 14 or 18. In turn, the respective transmitter, when activated, will transmit a high frequency radio signal to receiver 22, which is adjusted to react to the high frequency radio signal and is normally located proximate to the main water line 31 and water valve 26, delivering water into the house 2.

As seen in FIG. 1, and for illustration purposes, a water leak from hot water tank 8 is shown. The detector 20, which is electronically adapted to detect water by closing an electronic circuit, as will be explained below, electronically activates the transmitter 18. The transmitter 18 emits high frequency radio waves 28, as seen in FIG. 1, which are received by the high frequency radio receiver 22. Alternatively, the communication between the transmitter 18 and receiver 22 can be hard wire, or optical fibre, or some other suitable communication connection. The receiver 22, which is electrically connected to an electric motor 24, electronically activates the motor 24, which in turn mechanically shuts off the water valve 26. Thus, there is no more water leakage, and water damage due to unwanted water leakage is minimized. A service man is then called in to repair the leak.

The motor 24 for valve 26 is encased in a housing which includes a gear, motor and tap engaging tangs. The housing is securable to the valve 26 and the main water intake pipe 31. The housing does not need to be secured to adjacent structure of the house 2, and can easily be used in a concrete lined basement. The housing has adjustment securing means to accommodate water pipes of different diameters.

The motor 24 is typically regulated so that it will rotate a specified number of times in opening or closing the valve 26. There are several different ways of limiting the number of rotations that are applied to the valve to turn off the water valve 26. The motor 24 will normally be sold in the "closed position", so that when the installer installs it on the tap of the valve 26, also in the closed position, the motor 24 and electronics will be automatically "zeroed". The installer then unscrews the tap of the valve 26 to open it. The number of revolutions of the tap are then counted by the electronics of the apparatus, using one of several methods. A shaft encoder is suitable, but a simple mechanical limit switch on a slowly rotating gear is probably be simpler. No complex adjustment is required for the installer, so the invention can be installed by an average householder, or handyperson.

The system can be expanded by installing a water detector in all areas of the house where water might leak, that is, anywhere where there is a water tap. Thus, there could be water detectors in bathrooms, kitchens, basements, etc. of the building. Also, gas sensors can be installed wherever there is gas being used, for example, the gas stove 3. If the hot water tank 8 is gas fired, then a gas detector will be installed in place of detector 20. A suitable carbon monoxide sensor (not shown) will be included to ensure that combustion of the natural gas is efficient.

Each water detector, when contacted by leaking water, would emit an ultrasonic or radio frequency signal which, for a particular house, would all be at the same frequency. To avoid the possibility of interference with signals generated by an adjacent neighbour's house, the water detectors have adjustable custom set output frequencies. Alternatively, hard wiring can be used.

It will be understood by a person skilled in the art that other types of suitable on-off water and/or gas valves can be substituted so long as they are approved by the regulatory authorities.

It will also be understood that apart from electrically powered water appliances, the invention is also applicable to natural gas or propane powered appliances, for example, gas heated hot water tanks, gas heated boilers, and the like. The system in such cases will include gas detectors, as well as water detectors, which can be pre-set to detect threshold levels of the respective gas. Gas detectors can also be installed to detect threshold carbon monoxide levels and activate alarm and shut off systems if carbon monoxide levels rise above safe levels.

Figure 2:
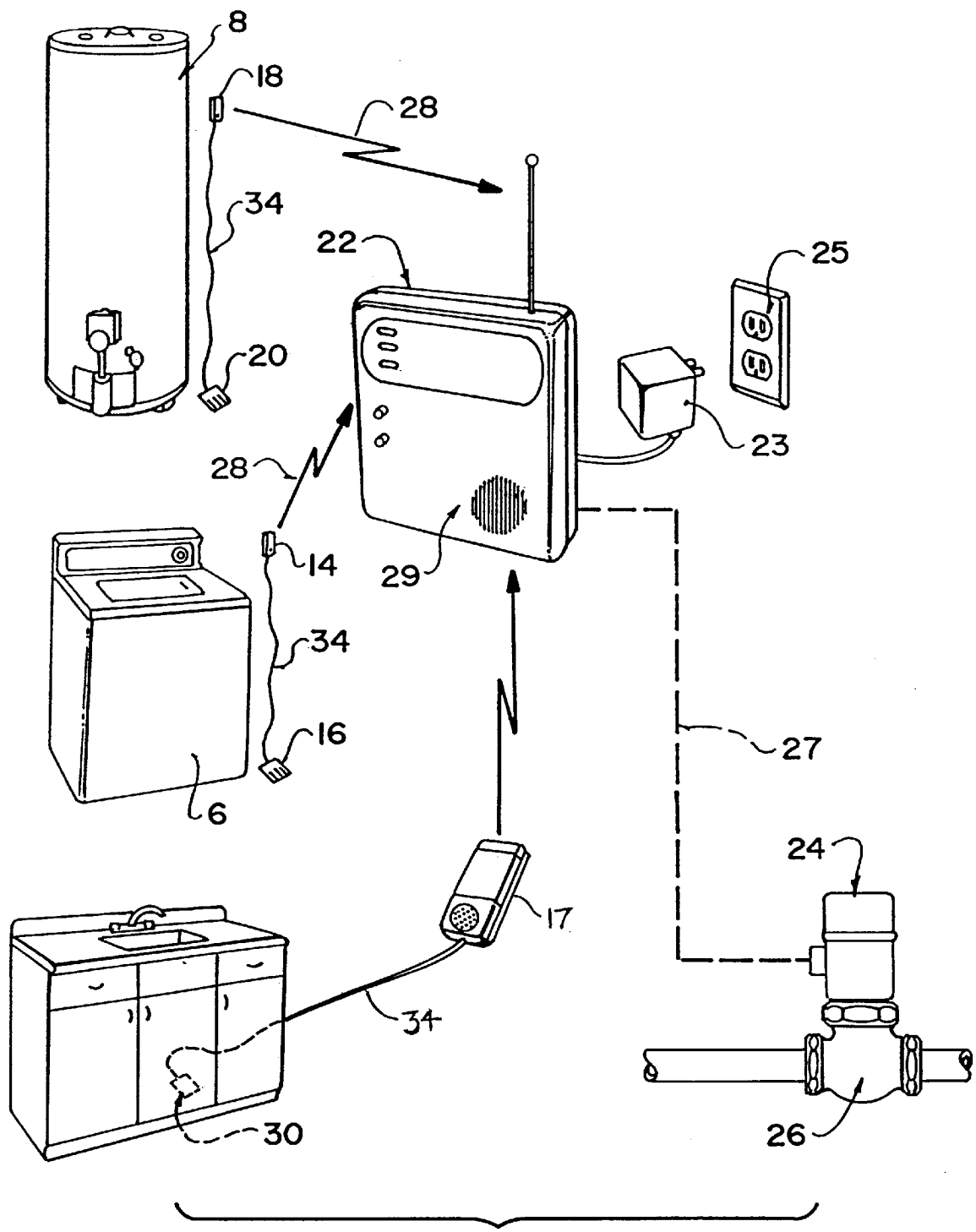
FIG. 2 illustrates an enlarged detailed isometric view of various household appliances equipped with moisture detectors, detection transmitters, detection receivers and automatic water valve shut-off, according to the invention.

FIG. 2 illustrates an enlarged detailed isometric view of various household appliances equipped with moisture detectors, detection transmitters, detection receivers and automatic water valve shut-off, according to the invention. Specifically, FIG. 2 illustrates in isometric view a clothes washer 6, which is equipped with a transmitter 14 (shown magnified as well) and an external fluid (water) detector 16, which is positioned at floor level, where leaking water is likely to be detected. The transmitter 14 and detector 16 are connected by wire 34. Similarly, hot water tank 8 is equipped with a transmitter 18 connected by wire 34 to an external fluid (water) detector 20, which is positioned at floor level, where leaking water is likely to be detected. FIG. 2 also shows a typical kitchen sink equipped with an internal water detector 30, positioned below the sink inside the cabinet. When a water leak occurs in any one of these appliances, the affected water detector 16, 20 or 30, as the case may be, will sense the water leak and by being connected by respective connector wires 34 to the respective transmitter 14, 17 or 18, emits a high frequency radio signal 28 (shown as a jagged line), which is received by water detection receiver and control 22. The receiver 22 illustrated in FIG. 2 is typically equipped with a power switch, a low battery detection light (typically an LED light), a water-off light (LED), a reset (water-on) switch and a vacation switch, which is activated when the inhabitants of the house go on vacation. Optionally, the receiver 22 can include a loudspeaker 29, which transmits an audible alarm sound (piezoelectric) or electronic voice, which can be heard by the house residents. Typical batteries to power the receiver 22 and transmitters 14, 17 and 18 are lithium coin cell and Ni—Cd batteries. Alternatively, the transmitters 14, 17 and 18 and receiver 22 can be powered by low voltage transformers 23 (one of which is shown for receiver 22) which are typically plugged into standard 110–120 volt AC outlets 25. Various standards associations, such as the Canadian Standards Association (CSA), because of potential electrocution problems, do not permit potentially lethal 110–120 volt alternating current to be used in environments where there might be water present. Accordingly, it is necessary to have a low voltage transformer 23, drawing 110–120 volt alternating current power from the outlet 25 and converting it to low voltage, such as 12 volts, for powering the transmitter 22, and the other electronic devices. The transmitter 22 is connected by wiring 27 to an electrically activated motor 24 which, upon activation by a signal from transmitter 22, shuts off water supply valve 26.

The transmitters 14, 17 or 18 can be adapted and manufactured to include an internal moisture detector, a daily supervisory transmission facility, and low battery supervisory transmission facility. Long life lithium batteries or Ni—Cd can be used in case of power failure. The transmitters can include built in terminals for connection to external moisture detectors by connecting cable wire. Alternatively, they can be hard wired to existing electricity sources. The transmitters can also include circuitry and controls to enhance radio or high frequency audible range.

The receiver 22 is typically manufactured and adapted to operate on safe, low voltage, such as 6 to 12 volts. The receiver 22 can include electronic circuitry to monitor supervisory transmissions. It can also include outputs to control the water valve 26 and trigger alarm systems if need be. The receiver 22 can include power, low battery and water off indicators, reset and vacation pushbuttons, and a local alarm sounder. The entire system can be sold in kit form. The kit will typically include a control and receiver, a plug-in power transformer 23 with electrical cord, an electrically operated motor 24 and water valve 27 shut-off capability with connections, 30 feet connection wire 27, two moisture detection transmitters 14 and 18 with batteries, two external moisture detection detectors 16 and 20, and installation operation instructions. Other combinations can also be provided.

While only water appliances and water detectors are shown in FIG. 2, it will be understood that the concept can be readily converted in whole, or in part, to accommodate or include natural gas or propane type energy sources by including or substituting gas detectors in place of the water detectors.

Figure 3:
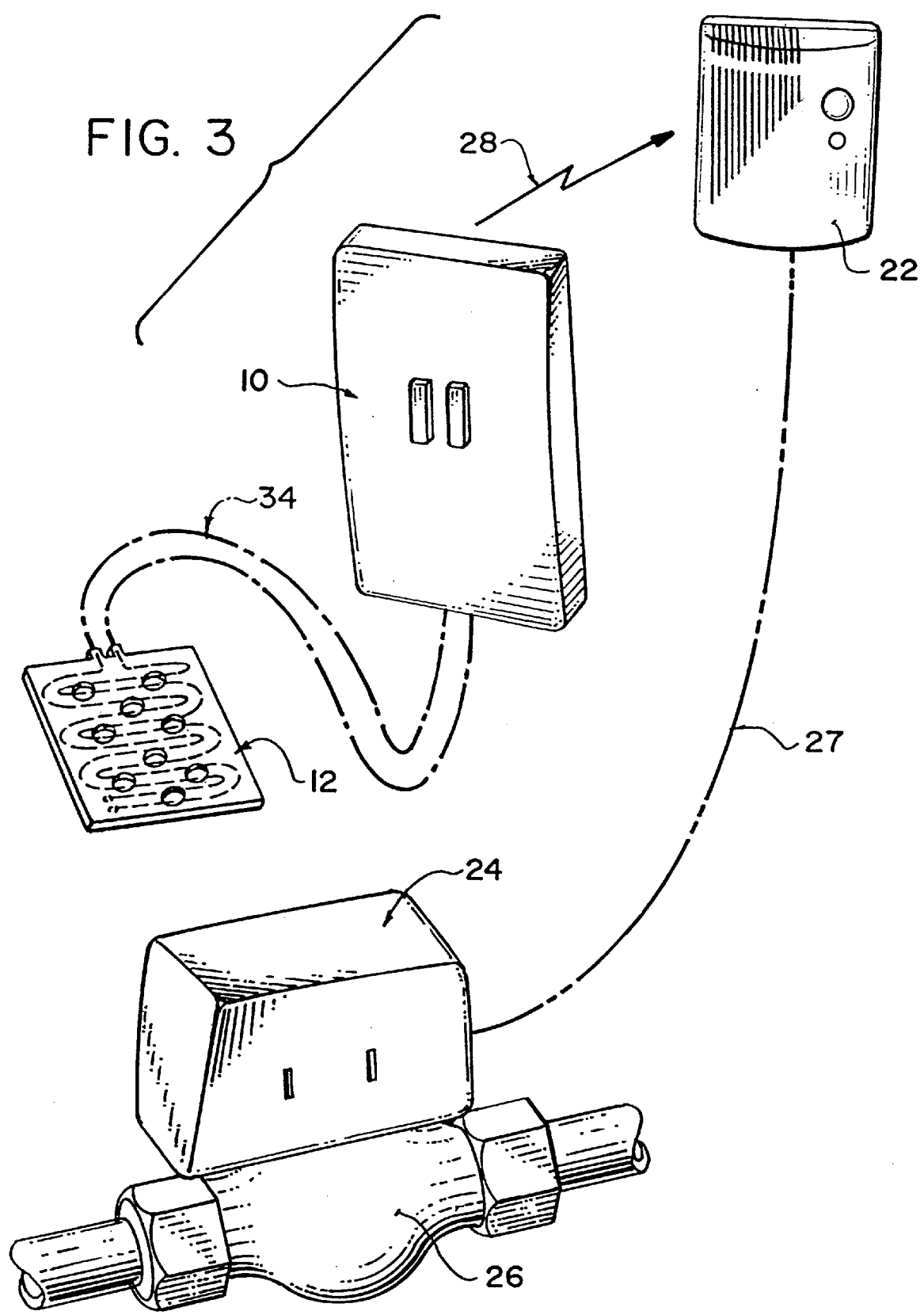
FIG. 3 illustrates a detailed isometric view of a water detector, a transmitter, a receiver, a water shut-off valve and a valve shut-off motor.

FIG. 3 illustrates a detailed isometric view of a water sensor 12, a transmitter 10, a receiver 22, a water shut-off valve 26 and a valve shut-off motor 24. Water sensors are readily available in the marketplace. As seen in FIG. 3, the sensor 12 is electrically hard-wire connected by wire 34 to the transmitter 10. The transmitter 10 communicates with the receiver 22 by radio waves. The transmitter 10 can, if desired, be "hard wired" to the receiver 22, that is, connected by electrical wire (not shown) rather than using radio waves. As shown in FIG. 3, transmitter 10 is of the design which transmits a high frequency radio signal, or alternatively, a high frequency audio signal, to receiver 22. The receiver 22, when it receives a signal from transmitter 10, transmits an electrical signal through wire 27 to electric motor 24, which is then activated and, by rotating through a predetermined number of turns via a gear arrangement (not shown), shuts off main water valve 26. Thus the water leak is stopped.

It will be understood that the system in whole or in part can be adapted to sense gas leaks, such as natural gas, carbon monoxide, or propane leaks, as well as water leaks. The detectors 12 are then sensors of a type which can sense the presence of methane, propane or carbon monoxide gas above predetermined levels. These gas detectors are readily available in the marketplace from a number of commercial sources. In the case of gas, the valve 26, instead of being a water valve, will be a gas shut-off valve of a design approved by compressed and combustible gas regulatory authorities. Otherwise, the other components are more or less the same as for the water shut-off system, but with different inserts. Of course, water and gas sensing systems can be combined as the need arises.

Figure 4:
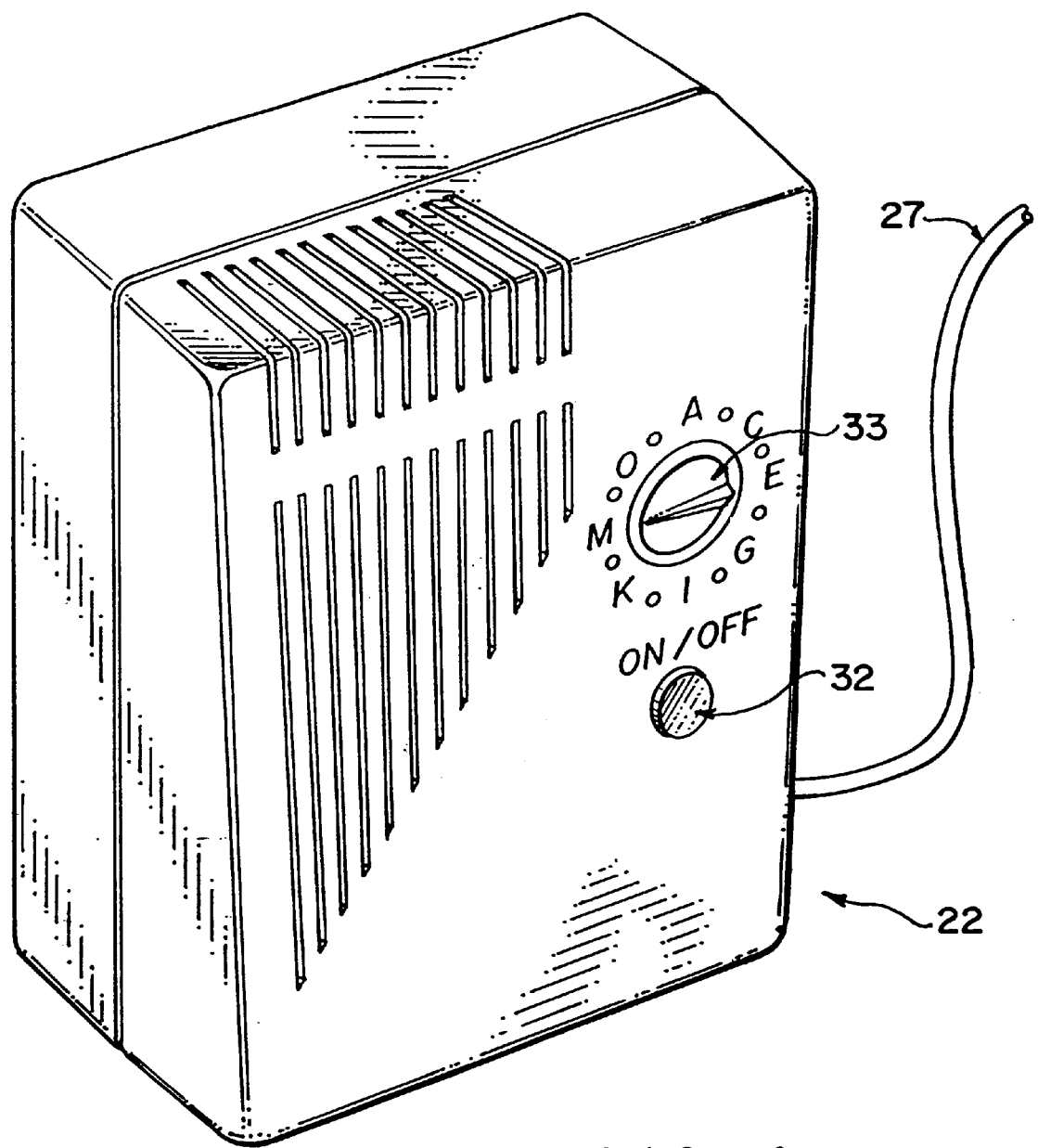
FIG. 4 illustrates an enlarged isometric view of a receiver module.

FIG. 4 illustrates an enlarged isometric view of one design of receiver module 22. The receiver 22 illustrated in FIG. 4 can include any number of optional operational features, supported by appropriate hardware and electronics. Specifically, the receiver 22 illustrated in FIG. 4 includes an on-off power switch 32, and a manual dial 33 to enable the operator to adjust the sensitivity and frequency of the receiver 22. It will be understood that other dials and control systems available in the marketplace can be used or included.

Figure 5:
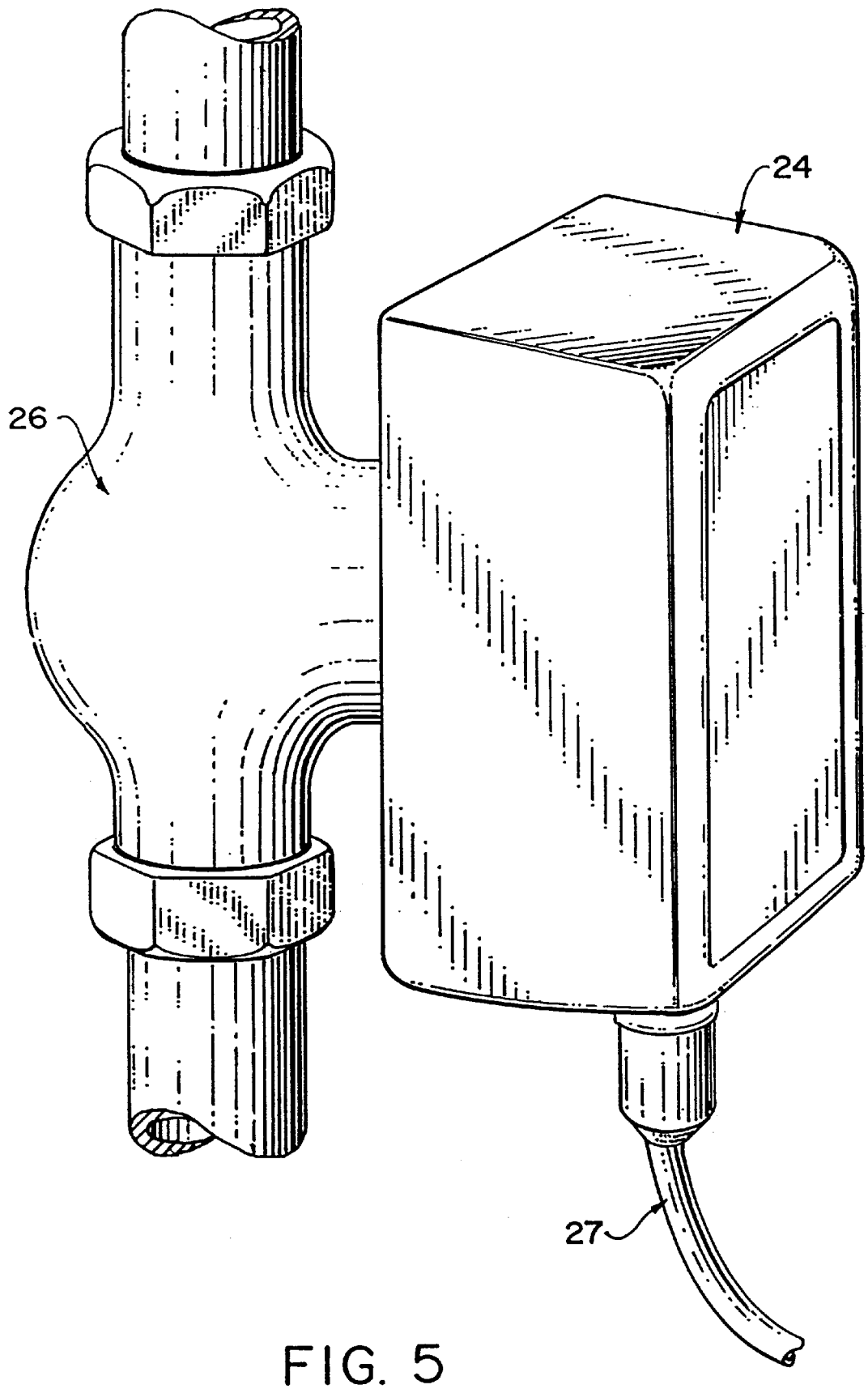
FIG. 5 illustrates an enlarged view of a water shut-off valve and a valve shut-off motor.

FIG. 5 illustrates an enlarged isometric view of a typical water shut-off valve 26 and a valve shut-off motor 24. As seen in FIG. 5, the electric motor 24 is connected directly to the main water shut-off valve 26 by a pipe which includes the valve shaft gears and tap (not shown but see FIG. 10). Alternatively, the valve 26 can be a gas shut-off valve for use with a natural gas or propane system. The motor 24 is housed in a protective casing 21.

Figure 6:
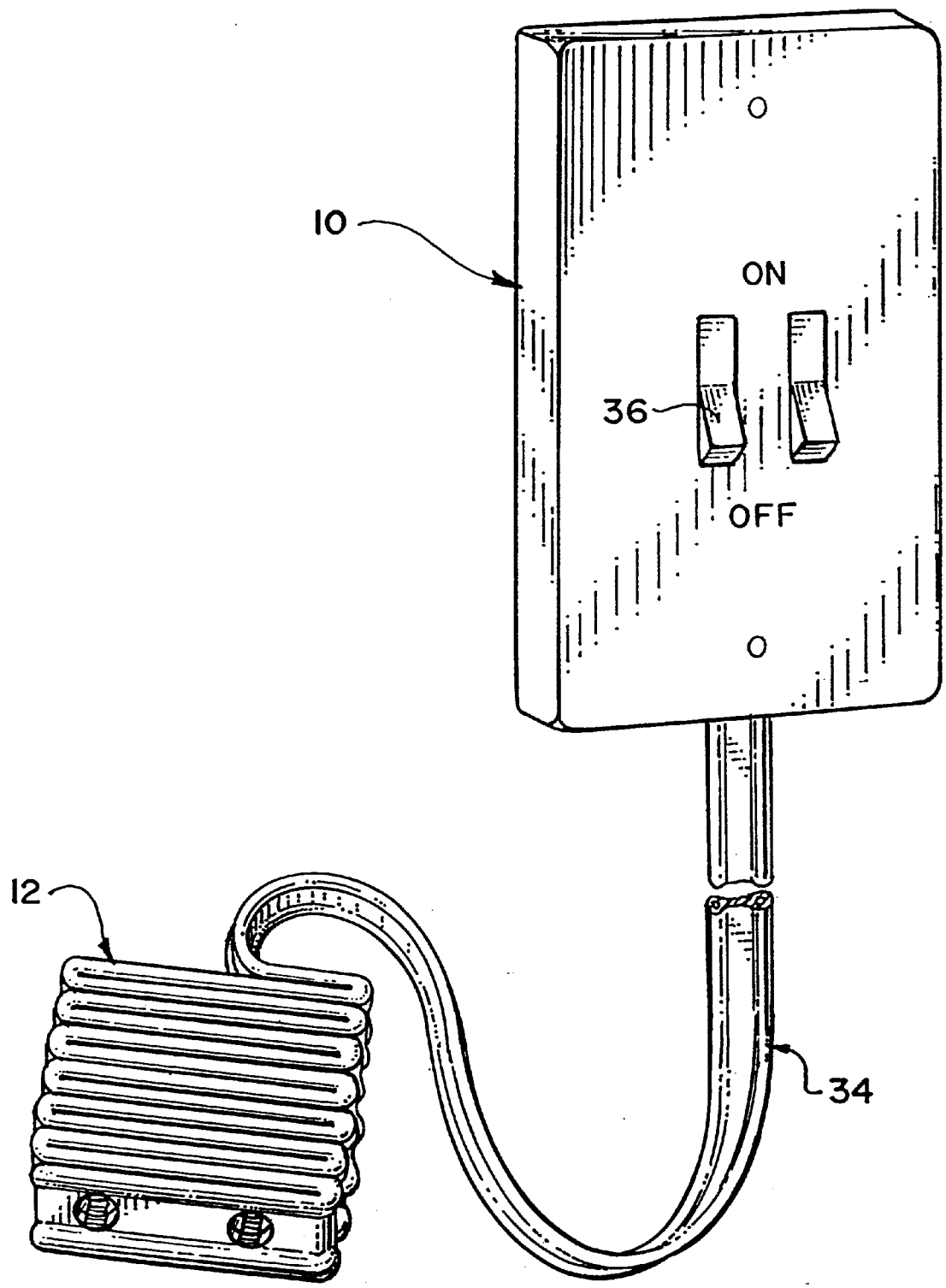
FIG. 6 illustrates an enlarged isometric view of a water detector and an on-off control transmitter.

FIG. 6 illustrates an enlarged isometric view of a water sensor 12 and an on-off control transmitter 10. Specifically, FIG. 6 illustrates the transmitter 10 connected by a low voltage wire 34 to the water sensor 12. The water sensor 12 can be of a standard type available in the marketplace. For instance, Linear Electronics Inc. of Carlsbad, Calif., sells a water detector which, when activated by water, closes (shorts) an electronic circuit and commences to transmit an electronic signal to the transmitter 10. As seen in FIG. 6, the transmitter 10 is equipped with an on-off switch 36 so that it can be manually turned off if desired.

As mentioned previously, it should be clearly understood that the subject invention is very versatile and is not restricted to water detection only. If desired, the system can be modified and expanded to accommodate other forms of energy fluids such as oil, diesel, or gasoline leaks. It can also include gas detectors, such as natural gas or propane, at appropriate locations, and in similar manner to those described for the water detection system. These can be connected by hard wiring or communicate by radio frequency, or some other means, to transmitters which, by having different frequencies, send transmission signals to appropriate receivers, which then activate corresponding electrical motors which shut off the main water or gas supply line (typically natural gas or propane) to the building. The two systems, fluid and gas, with separate respective detectors, can be used as combined systems to accommodate dwellings which are serviced by both water and gas. The system can also be adapted to mobile homes, trailers and recreation vehicles serviced by propane cylinders.

Figure 7:
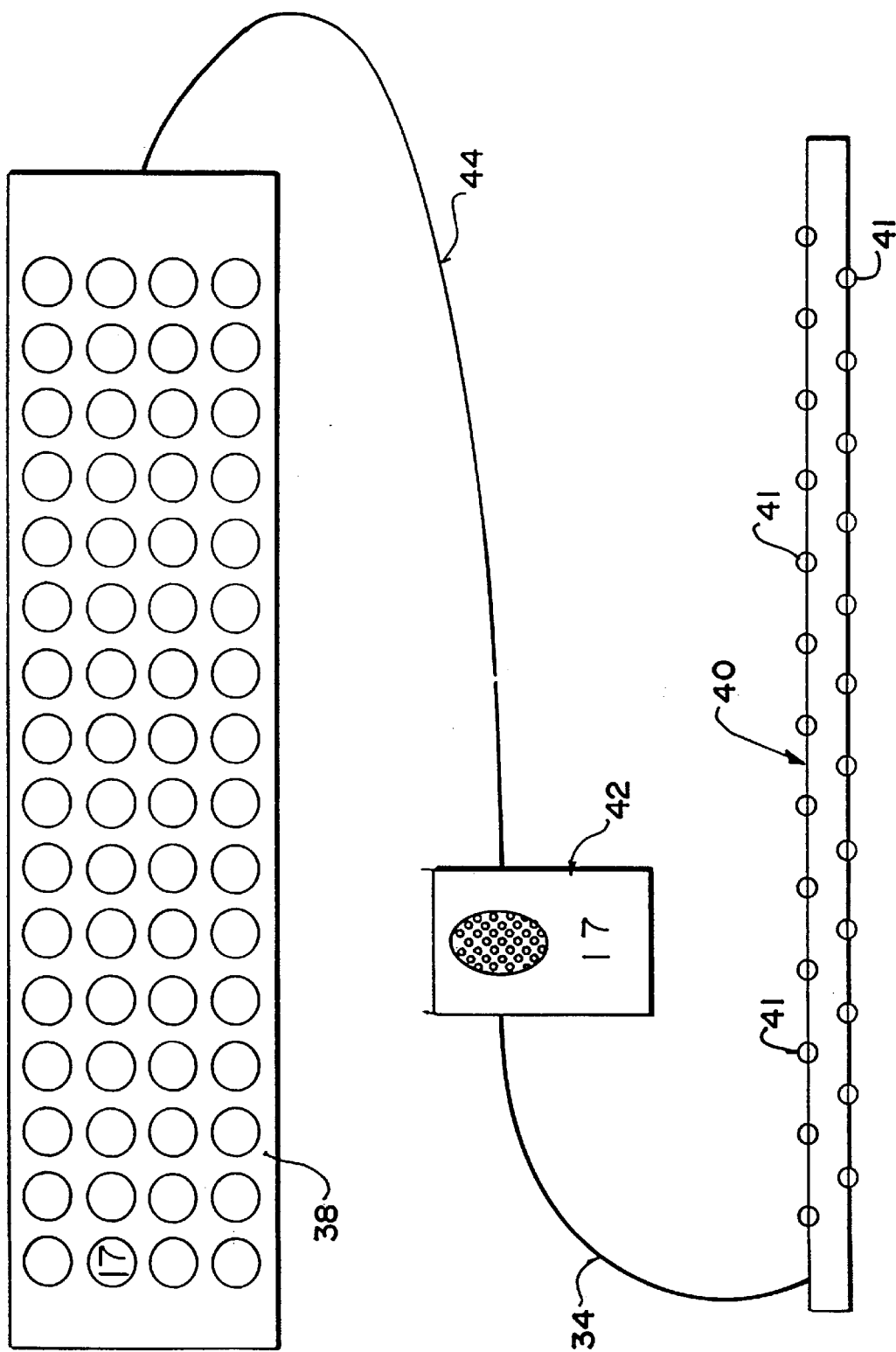
FIG. 7 illustrates a schematic front view of an electronic water detection system for a multiple unit hotel or apartment, with central control panel, and for illustration, a single alarm and water detector tape.

FIG. 7 illustrates a schematic front view of a multiple electronic water detection system for a multiple unit hotel or apartment, with central control panel 38 and for illustration purposes, a single alarm 42 and tape strip 40. It will be understood that as many water detectors 40 as are required to monitor the number of units in the building are included in the overall system. Further, the system can be expanded or modified to include gas sensors. As seen in FIG. 7, a main control panel 38 has display indicators for each room of the hotel or apartment building. According to the schematic diagram illustrated in FIG. 7, and to avoid clutter, only one water detector tape strip 40, deployed in one room of the building (typically the bathroom), and connected by an alarm 42 and hard wire 44 to the control panel 38, is shown. However, as alluded to above, it will be recognized that there will be corresponding tape strips 40, alarms 42 and hard wire 44, connected to respective indicators on the main control panel 38, which typically is deployed in either the hotel manager's or the apartment manager's office, or in a convenient location in the central area of the building, such as the lobby, which is a controlled area. In certain cases, the system may be linked by telephone, or some other means, to a central control unit. The system illustrated in FIG. 7 permits an entire multiple unit building to be monitored for water and/or gas leaks by a central control system.

As seen in FIG. 7, the tape strip 40 is of a type which has a pair of electrical low voltage wires running in parallel and encased in a suitable plastic, such as polyvinylchloride (PVC). At periodic locations along each wire, there are openings 41 in the covering plastic. Normally, the tape strips 40 are dry. However, if there is a water leak, and water contacts one or more of the openings in the tape 40, a harmless low voltage electrical short will occur which, in turn, will be detected by the electronics in the main control panel 38. An alarm 42, typically piezoelectric, will then sound in the room. Furthermore, an indicator light 17 will illuminate on the main control panel 38. The hotel manager or apartment manager, or the control centre, can then quickly recognize that an unwanted and potentially serious water or gas leak has occurred in one of the rooms in the building and take appropriate action. Running water taps, toilets, baths, sinks and the like, inadvertently or deliberately left on by hotel guests and apartment dwellers, are a common problem in the hotel and apartment industries, and cause considerable damage and raise insurance rates. The system disclosed herein effectively enables with this problem to be dealt with.

Figure 8:
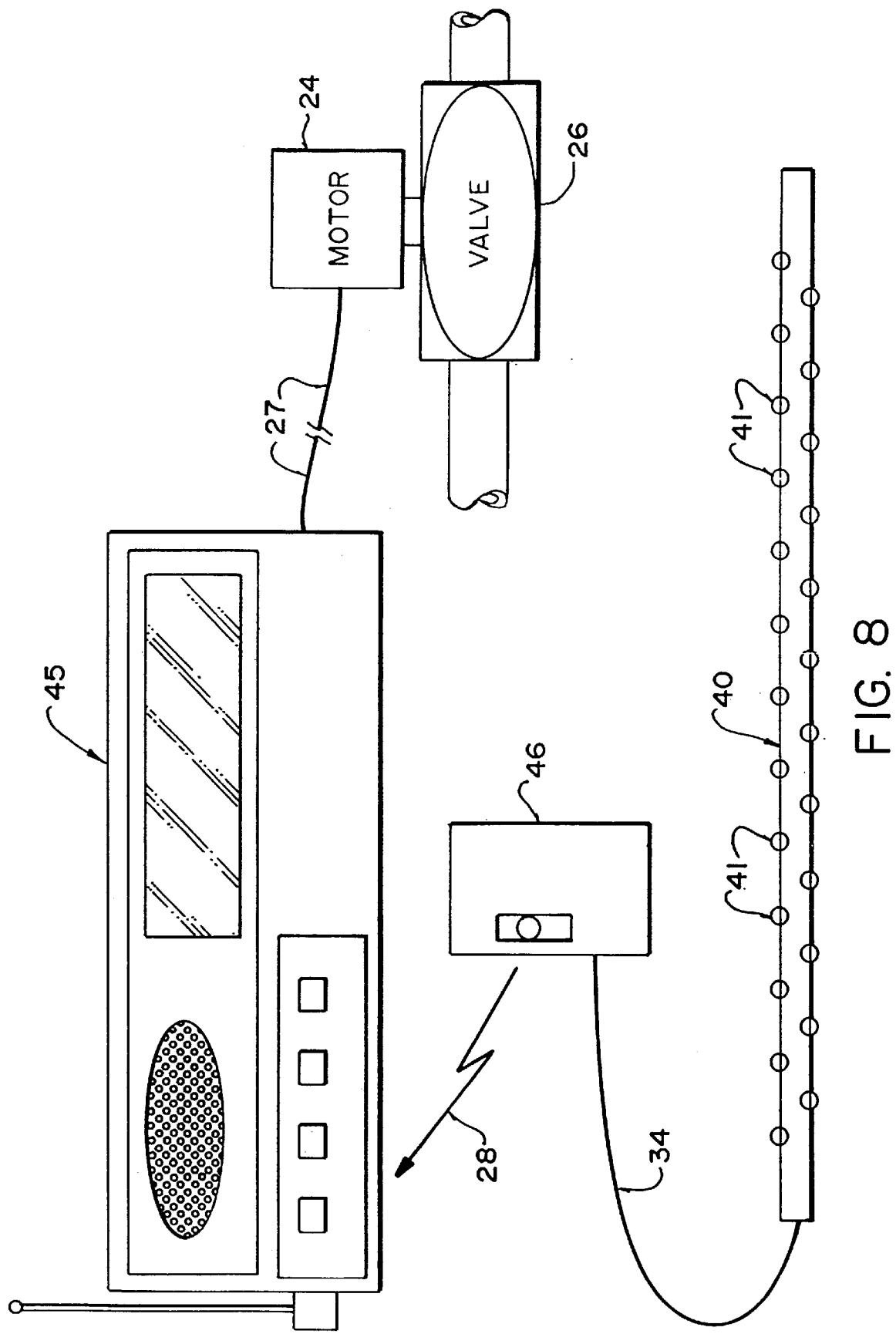
FIG. 8 illustrates a schematic front view of a water detection system for a single unit residential building, including main programmable alarm console, radio transmitter unit, water detector tape and motorized water shut-off valve.

FIG. 8 illustrates a schematic front view of a water detection system for a single unit residential building, including main programmable alarm console 45, radio transmitter unit 46, water strip tape 40 and motorized water shut-off valve 26. The system illustrated schematically in FIG. 8 is designed for installation in a residential building. The residential water detection system includes a main alarm console receiver 45, which can be similar to, or can be coordinated with, or built into a standard security alarm control panel. The main alarm console receiver 45 is similar in function to the receivers discussed previously and is hard wire connected by wire 27 to an electric motor 24, which in turn, when activated, shuts off main water valve 26, or a gas valve if applicable. In the latter case, the detectors are gas detectors. Of course, a combination system using both water and gas detectors can be employed, as the case may require.

FIG. 8 illustrates the same type of water tape strips 40 as discussed previously in association with FIG. 7, including a series of water detecting openings 41 in the tape 40. The tape 40 is connected by wire 34 to a radio transmitter unit 46, which can include an alarm light 48. The tape 40 is installed in each area where there may be a water leak. More than one tape 40 can be connected to one transmitter 46 if desired. The radio transmitter unit 46, when sensor tape 40 detects a water leak, transmits a high frequency radio signal to the main alarm console 45, which is connected by wire 27 to motor 24, thereby activating the main water valve 26 shut-off routine.

Figure 9:
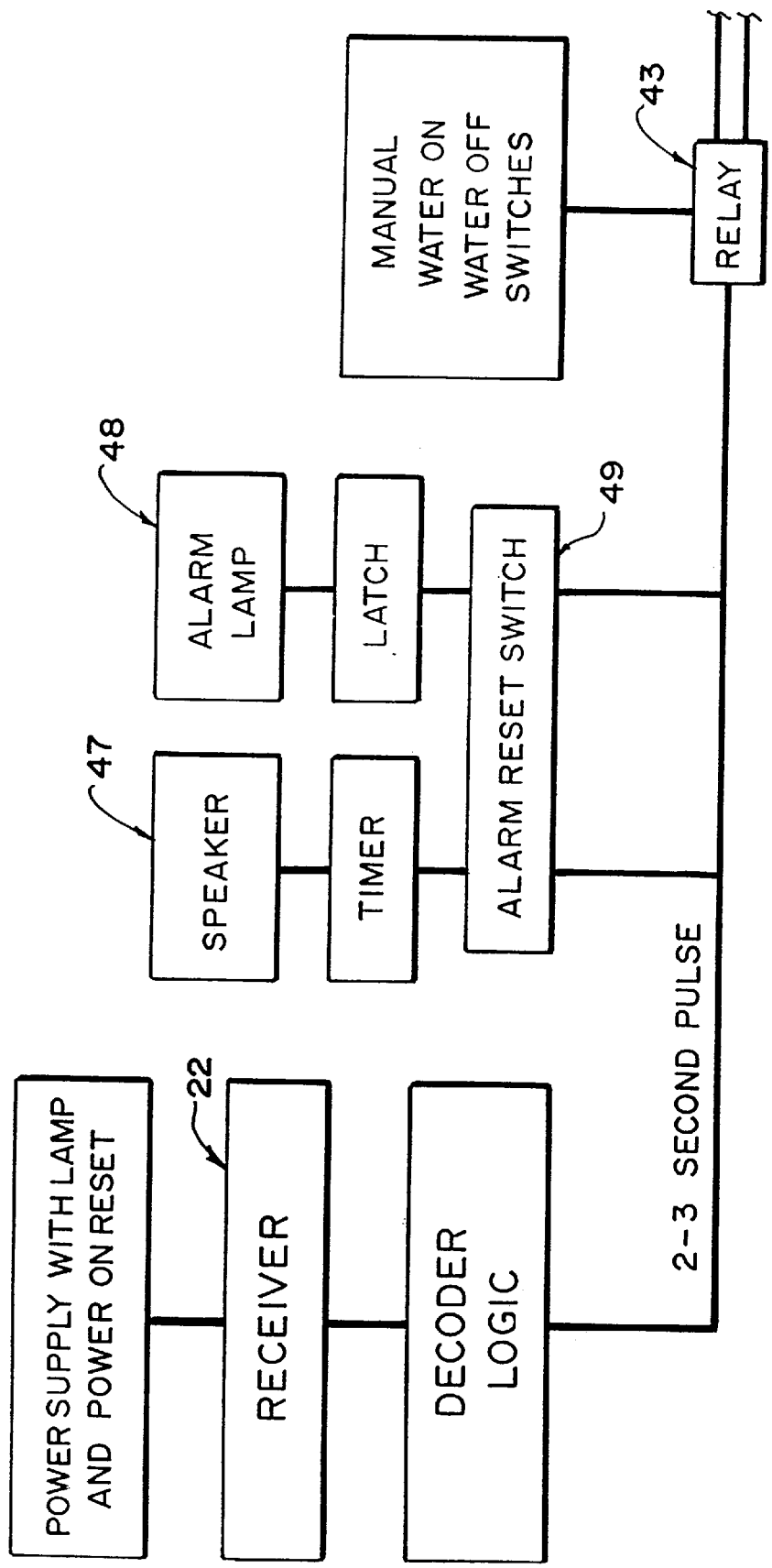
FIG. 9 illustrates a schematic view of a water detection receiver block diagram according to the invention.

FIG. 9 illustrates a schematic view of a water detection receiver block diagram according to the invention. The water detection receiver system illustrated in FIG. 9 includes a circuit which resets on power up to avoid accidental triggering. The receiver decoder logic operates on a 2–3 second pulse. When the receiver 22 is triggered, an alarm will sound through speaker 47 for five minutes as determined by a five minute timer and the red alarm lamp 48 stays on. A relay 43 signals the motor 24 (not shown) to shut off the valve 26 (not shown). The system includes an alarm reset switch 49 which shuts off the alarm 47 and the red lamp 48. It is usually preferable to use an electric motor 24, rather than a solenoid, to shut off the valve. An advantage of this is that the motor 24 draws current only when it is operating, such as when it is closing the valve 26. A solenoid valve, on the other hand, usually draws current on a steady basis in order to stay in a closed position. Solenoids would be suitable for use with gas systems, when gas utilities are present and gas sensors used. Suitable valves for both water and gas are available in the marketplace from Honeywell Inc. (U.S.A.) or Honeywell Limited in Canada.

Figure 10:
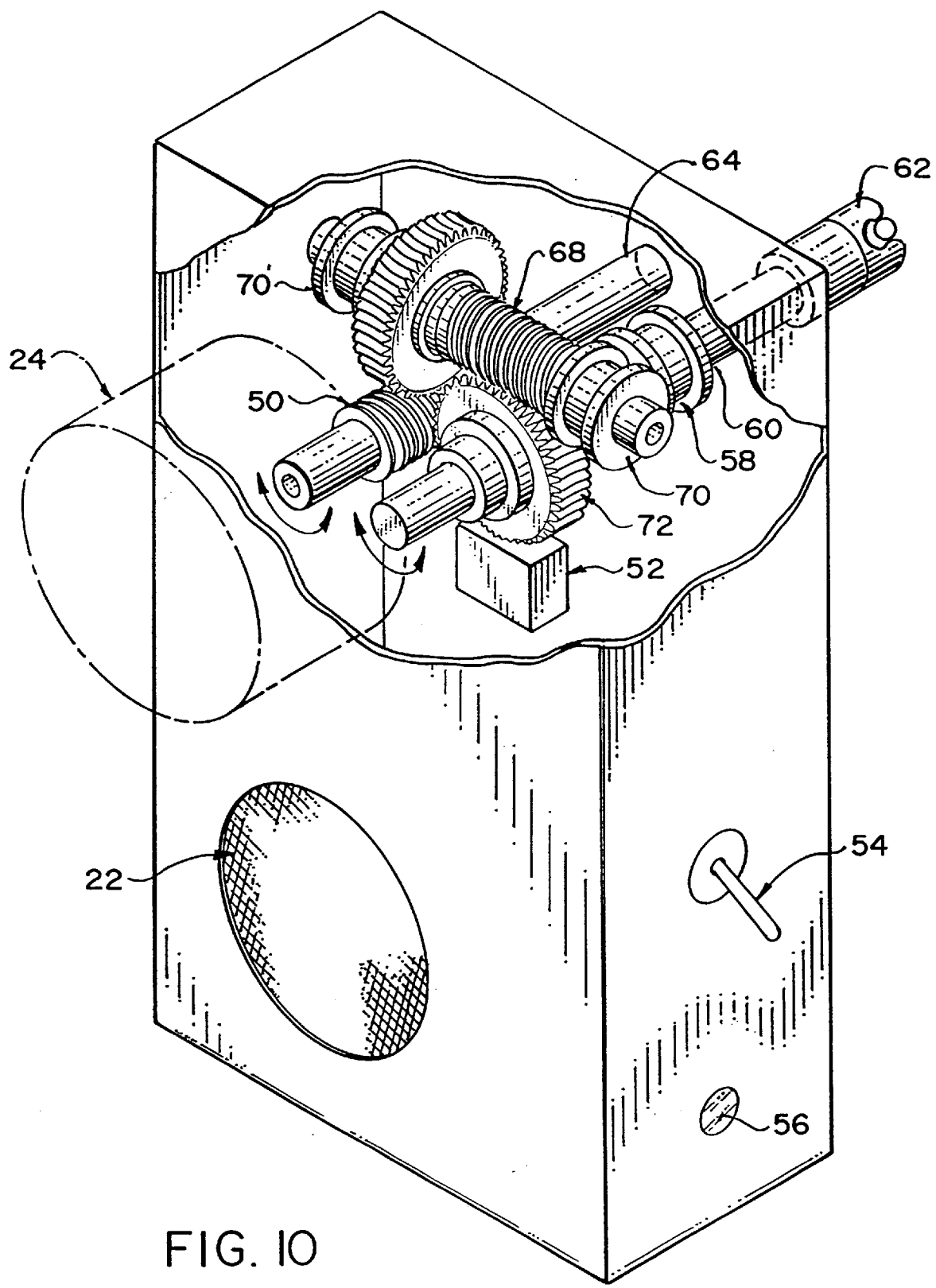
FIG. 10 illustrates an isometric partially cut-away view of an embodiment of receiver with a motor and gear arrangement for shutting off a water valve.

FIG. 10 illustrates an isometric partial cut-away view of a second embodiment of receiver with a motor and gear arrangement for shutting off a water valve. The second embodiment illustrated in FIG. 10 includes a motor 24 (shown in dotted lines), which is connected by gears to a shaft which can be connected to a valve (such as a main water or gas line valve) in order to shut off the valve. Specifically, as seen in FIG. 10, the motor and gear arrangement includes a worm gear 50, which is driven by motor 24. A four turn maximum limit switch 52, or sensory control, which is resettable, limits the number of rotations of the motor 24 so the motor 24 does not overwind the tap and stem of the valve, and strip the threads on the gears. The gear arrangement includes a bushing 58, a spacer 60, a solid shaft 62, and a guide shaft 64. A reverse/forward toggle switch 54 and an indicator light 56 are included. When the motor 24 is activated by the receiver 22 receiving an alarm signal from the transmitter (not shown), the gear arrangement is driven and controlled by maximum turn limit switch 52. This permits the motor 24 to make a predetermined number of turns, and by being connected by shaft 62 to the water shut-off valve (not shown), turns the attachment of the valve a predetermined number of rotations in order to close the valve. The motor 24 can be reversed by throwing switch 54.

Figure 11:
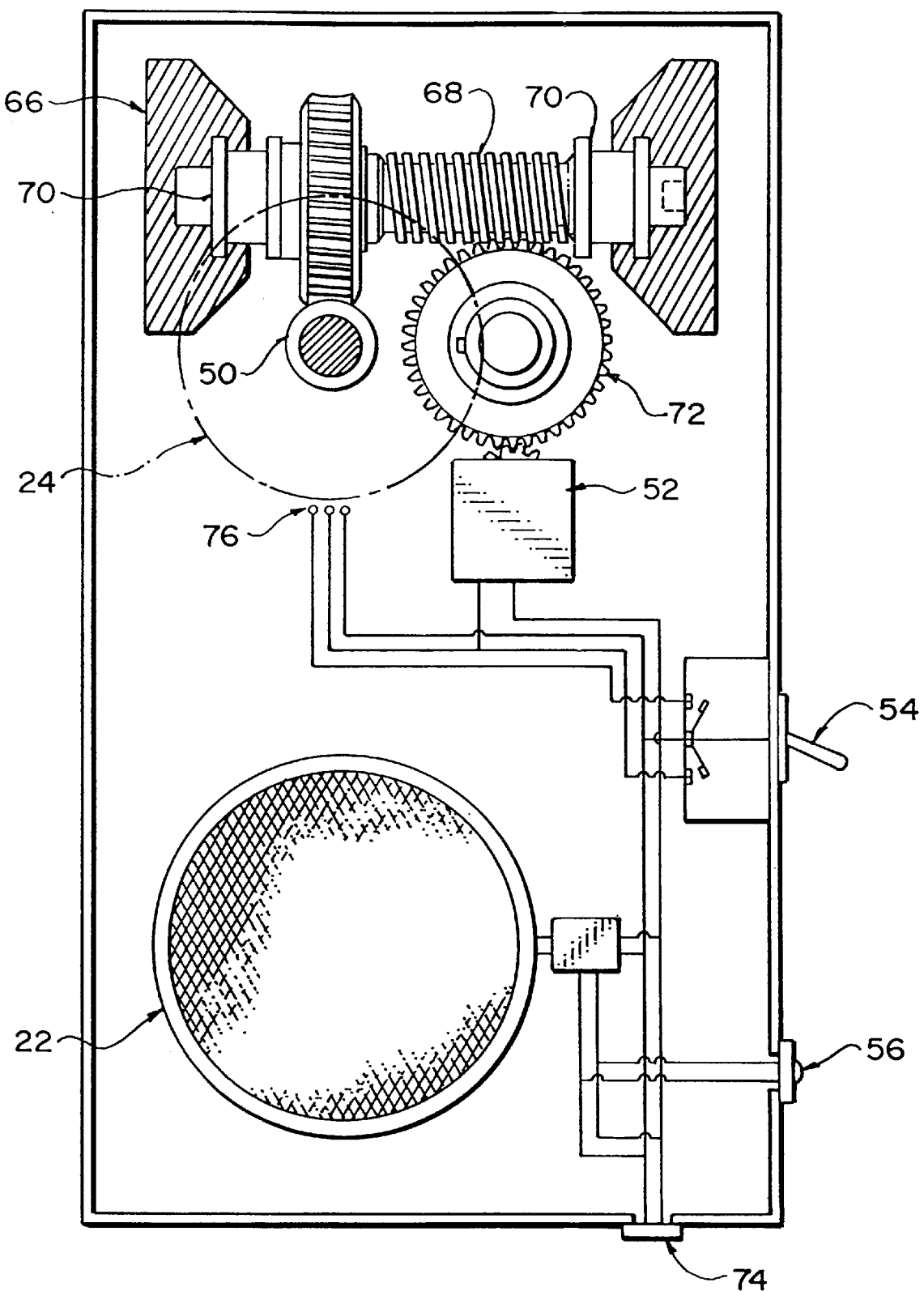
FIG. 11 illustrates a front cut-away schematic view of a high frequency receiver with gear control for automatic water shut-off.

FIG. 11 illustrates a front cut-away schematic view of a third embodiment of one aspect of the invention, that is, high frequency receiver 22 with gear control for automatic water shut-off. FIG. 11 illustrates from a different view point many of the same parts as illustrated and discussed previously in FIG. 10. However, FIG. 11 also shows a pair of stabilizing blocks 66, which hold the gear assembly in position. A gear exchanger 68, a collar 70, and a solid gear 72 which is connected to shut-off valve shaft 62, are also shown. A power supply 74, and an electrical motor connection 76 are also shown. The circuitry for the light 56, the reverse toggle switch 54 and the limit switch 52 are also shown.

FIG. 12 illustrates an isometric view of a connector for a mechanical gear drive assembly. Specifically, FIG. 12 illustrates one design of connector that can be used to connect the gear drive assembly illustrated in FIGS. 10 and 11 to an external main valve assembly 26. It will be appreciated that other types of connectors are possible or can be used. As illustrated in FIG. 12, the solid drive shaft 62 (see also FIGS. 10 and 11) can be connected by a connector 77 to a gear stem 78 of a water shut-off valve 26. Shaft 62, when rotated, rotates connector 77, which in turn rotates valve coupler shaft 78. Shaft 78 then either shuts off or opens valve 26, depending on the direction of rotation, and gear assembly required for valve activation.

Figure 13:
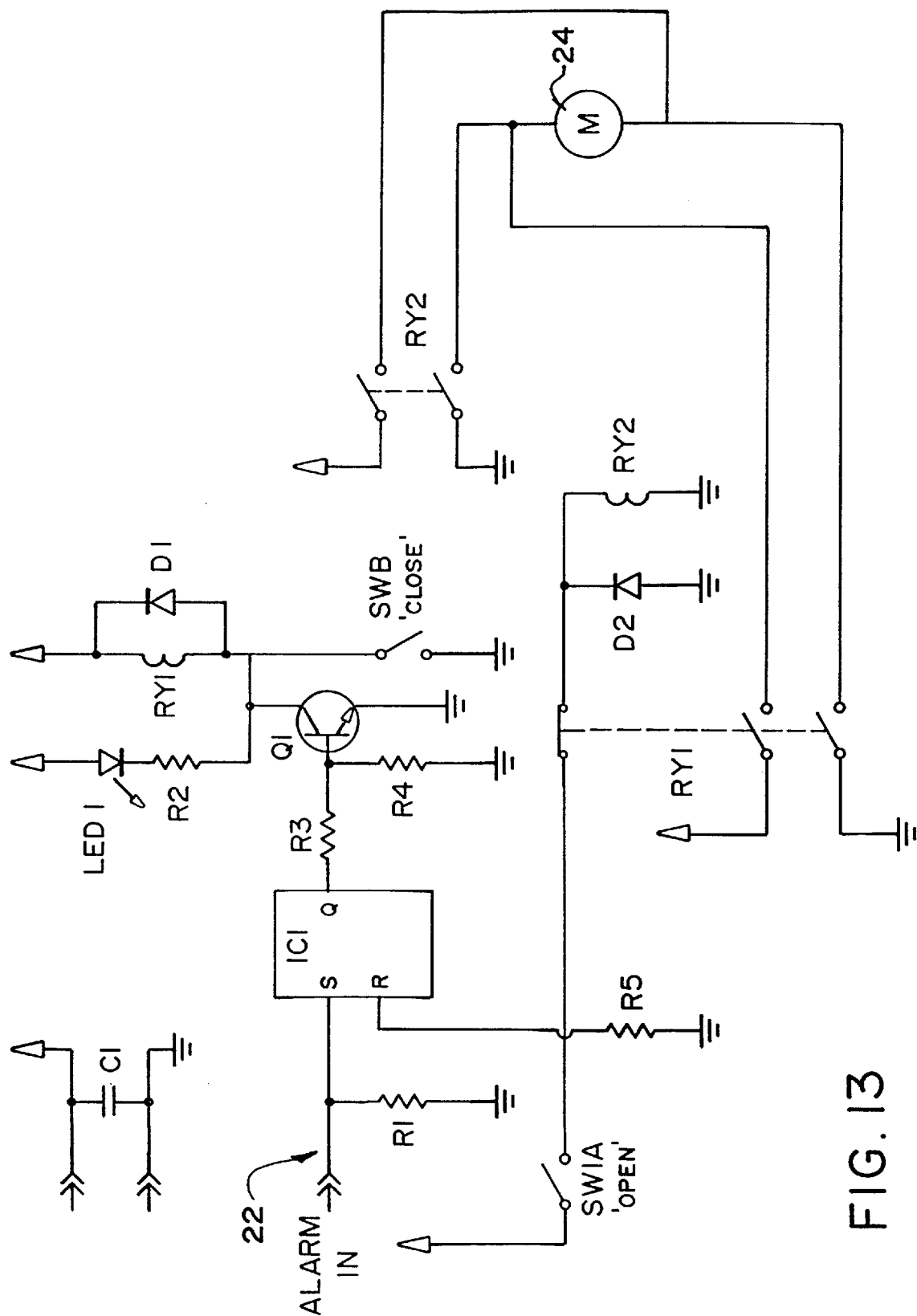
FIG. 13 illustrates an electronic circuit diagram of a receiver and motor activation circuit.

FIG. 13 illustrates an electronic circuit diagram of a receiver and motor activation circuit. The circuitry includes a number of resistors (R), switches (SW), diodes (D), coils (RY), capacitors (C) and light emitting diodes (LED), connected together in a manner which is understood by any person skilled in electronics and design of electronic systems, to perform the functions of the invention. Other types of electronic circuits can be substituted as need be. The alarm is received at "alarm in" (receiver 22) and the circuit then closes to activate motor 24. The activator switch operates between the three vertical contact points. The circuit can be incorporated in a standard silicone chip, which can be easily installed or replaced. If required, a computer can be included in the system, or used to replace other electrical components. FIG. 14 illustrates a circuit diagram of a five volt AC to DC floating control VC actuator. These circuits provide greater control by giving in between settings rather than straight on-off settings. FIG. 15 illustrates an alternative wiring diagram of a five volt AC to DC floating control. The actuator will function in a regular 2-position (on/off) mode if the controller does not have an off-centre capability.

Figure 16:
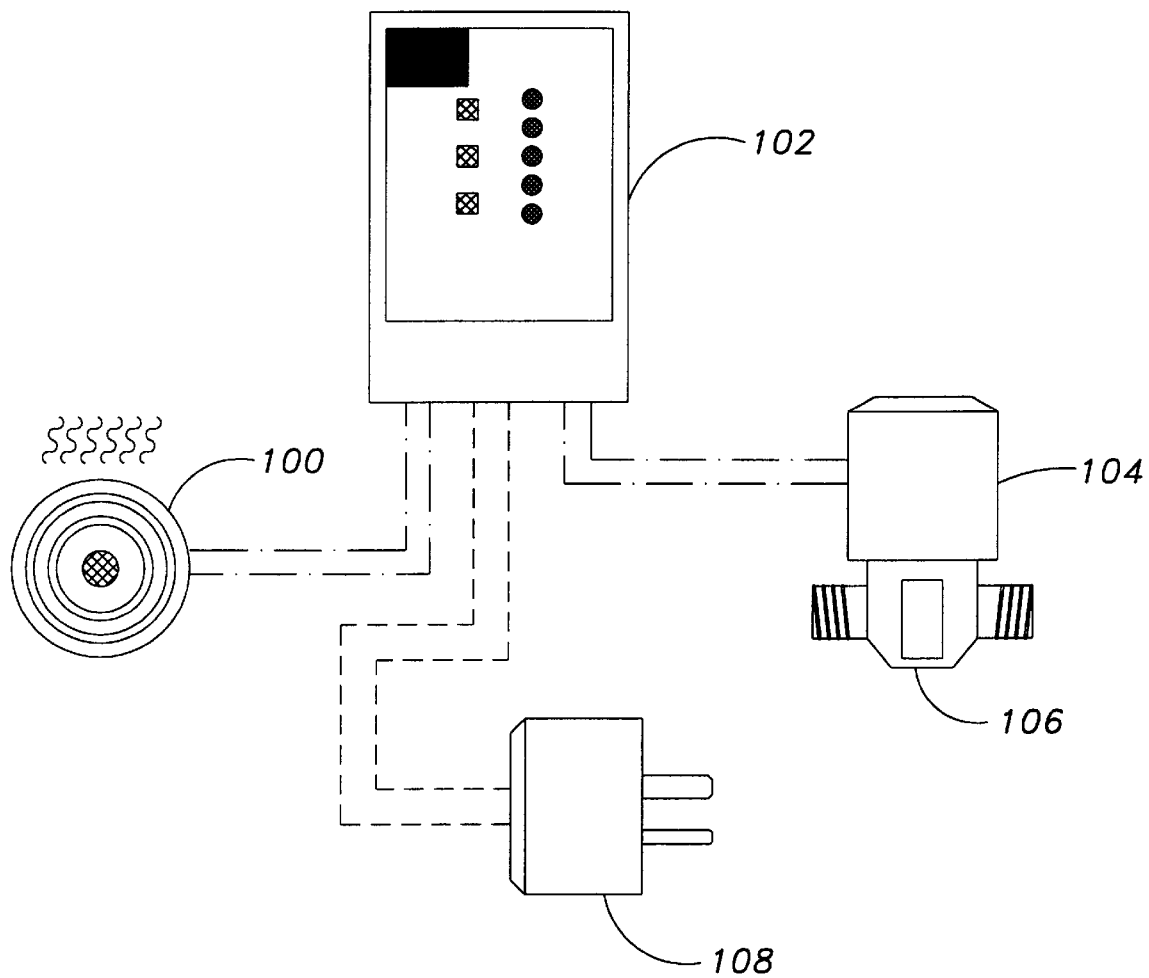
FIG. 16 illustrates a schematic diagram of a gas sensor connected to a powered receiver control and a motorized gas shut-off valve.

FIG. 16 illustrates a schematic diagram of a gas sensor 100 connected to a powered receiver control 102 and a motorized gas shut-off valve 106. As seen in FIG. 16, a gas sensor 100, which can be of any type available on the market, is electronically set to sense detectable limits of natural gas, propane and/or carbon dioxide. The sensor 100 is connected, either by hard wiring (or if preferred, radio frequency) to a control panel 102. The control panel 102 typically has a number of control buttons and lights thereon. The control buttons can be for settings such as off, on, alarm, reset, vacation, silent, etc., as required to suit the situation. The control panel 102 also includes electronic circuitry which springs into action when above prescribed levels of gas are detected by sensor 100 and conveyed to control panel 102. In that case, the control panel 102, which includes transmitter circuitry, issues a command, either by hard wire, or radio frequency, to receiver 104, which then prompts valve 106 to close. Valve 106 is connected to the input natural gas line or propane line, as the case may be. The control panel 102, sensor 100, receiver 104, are powered by electricity which is received via plug 108.

Figure 17:
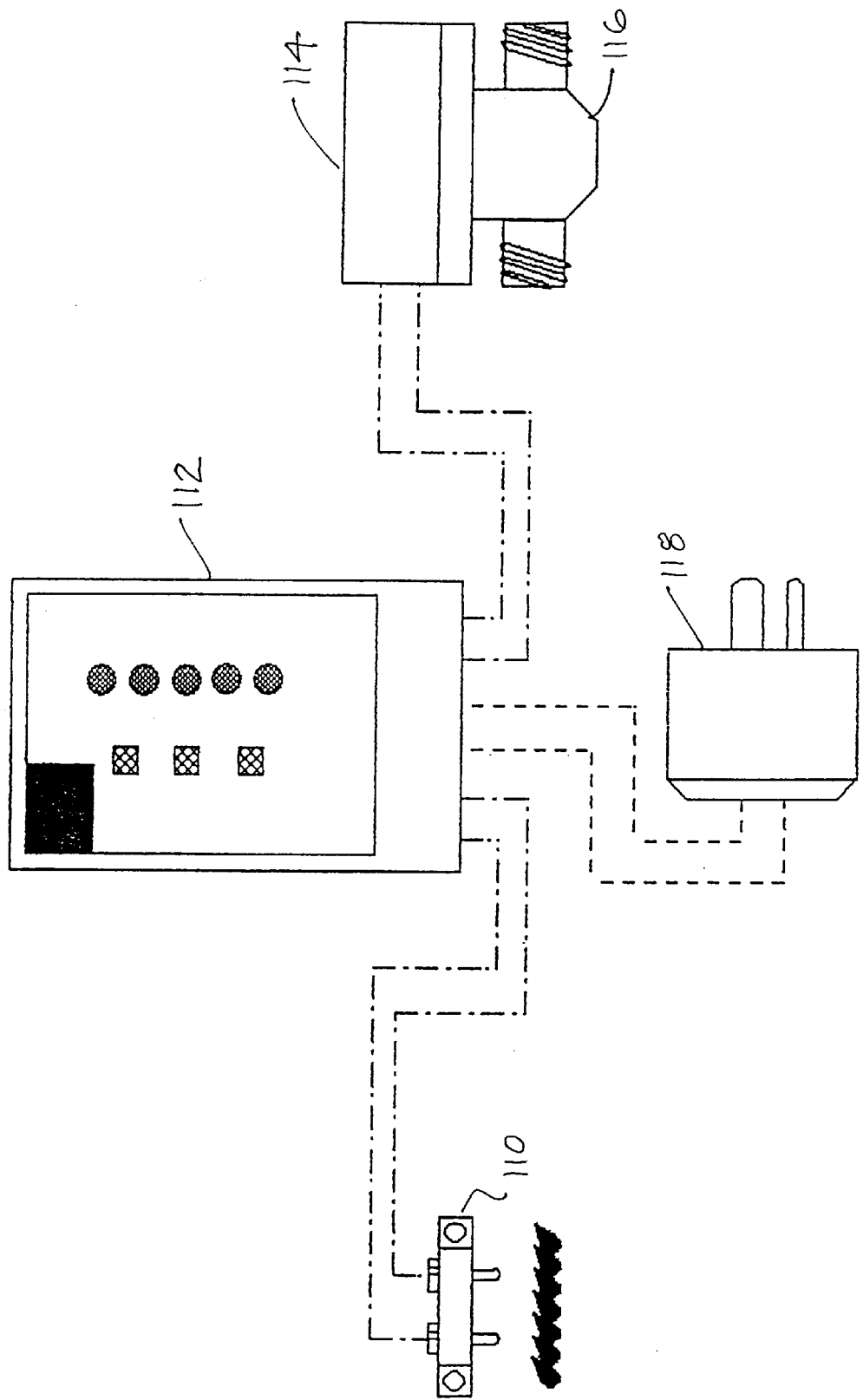
FIG. 17 illustrates a schematic diagram of a liquid sensor connected to a powered receiver control and a motorized gas shut-off valve.

FIG. 17 illustrates a schematic diagram of a liquid sensor 110 connected to a powered receiver control 112 and a valve 116. As seen in FIG. 17, a water sensor 110, which can be of any type available on the market, is electronically set to sense detectable limits of water. The sensor 110 is connected, either by hard wiring (or if preferred, radio frequency) to a control panel 112. The control panel 112 typically has a number of buttons and lights thereon. The buttons can be for settings such as off, on, alarm, reset, vacation, silent, etc., as required to suit the situation. The control panel 112 also includes electronic circuitry which activates when above prescribed limits of water are detected by sensor 110 and conveyed to control panel 112. In that case, the control panel 112, which includes transmitter circuitry, issues a command, either by hard wire, or radio frequency, to receiver 114, which then prompts valve 116 to close. Valve 116 is connected to the input water line. The control panel 112, sensor 110, receiver 114, are powered by electricity which is received via plug 118.

Figure 18A:
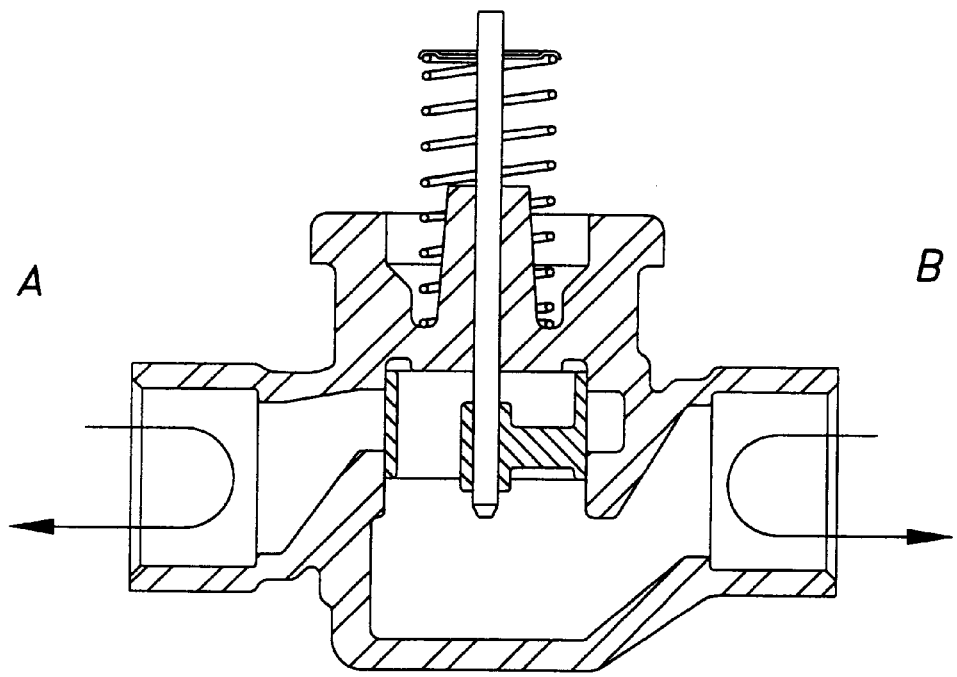
FIGS. 18A and 18B illustrate section views of an alternative embodiment of on-off control valve, in respective closed and open positions.
Figure 18B:
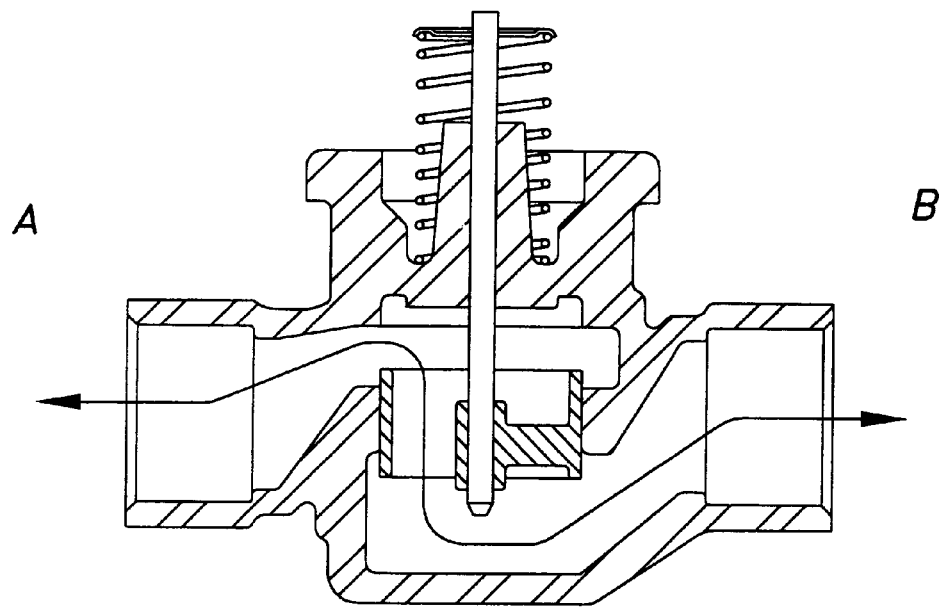

FIGS. 18A and 18B illustrate section views of an alternative type of on-off control valve. FIG. 18A illustrates the valve in closed position as indicated by the arrows. FIG. 18B illustrates the valve in an open position as indicated by the flow through arrow. In FIG. 18A, the valve stem is in a raised position which closes the valve. The stem can be raised by a suitable motor. In FIG. 18B, the valve stem is in a lowered position to open the valve.

Figure 19:
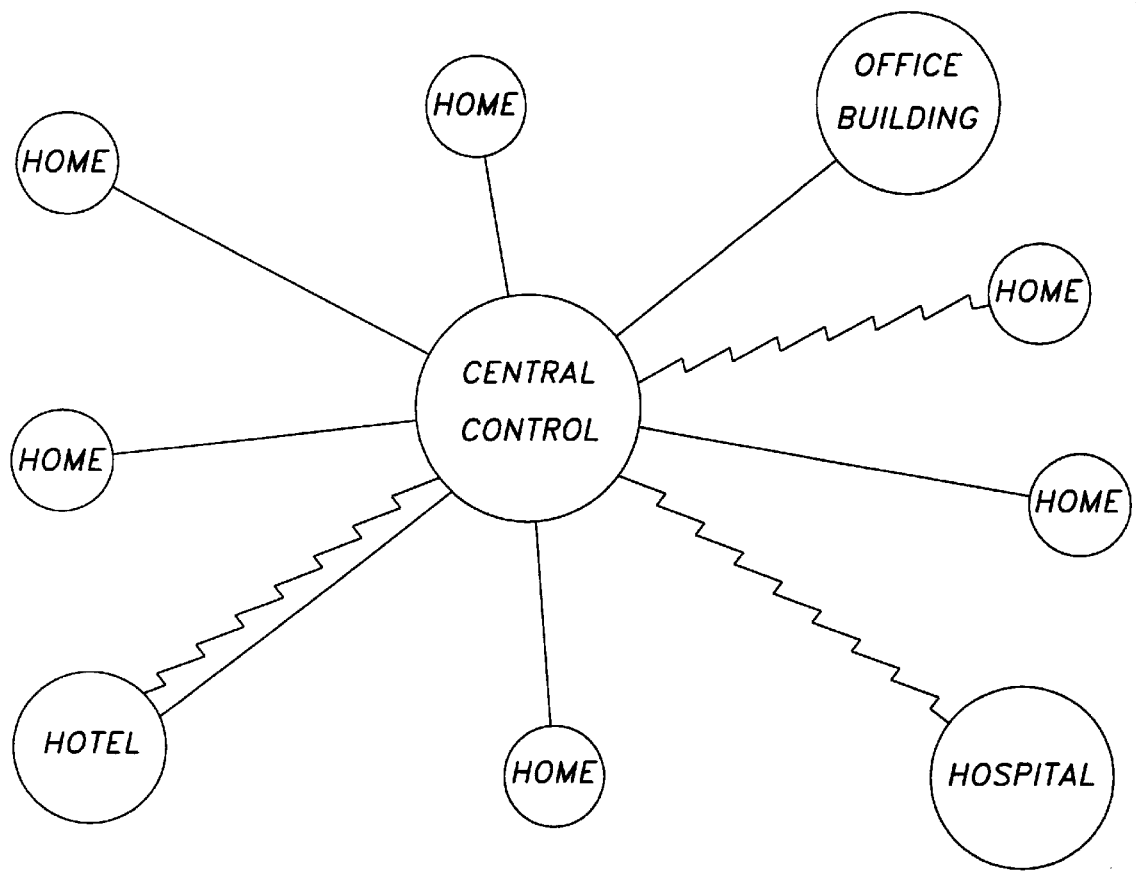
FIG. 19 illustrates a schematic plan of a network of homes, hotel, office building and hospital monitored by a central control facility by hardware or radio.

FIG. 19 illustrates a schematic plan of a network of homes, hotel, office building and hospital monitored by a central control facility by hardware or radio. As seen in FIG. 19, a central control network system can be established to accommodate a number of residential homes, office buildings, hospitals, hotels, and the like. The system can be installed in a community and operated by a company which sells gas and water detection and shut-off systems and provides the service for a rental rate. Communication between the different buildings and the central control can be conducted over hard wire systems, telephone lines, radio frequency systems, cellular telephones, or whatever communication system is suitable.

Figure 20:
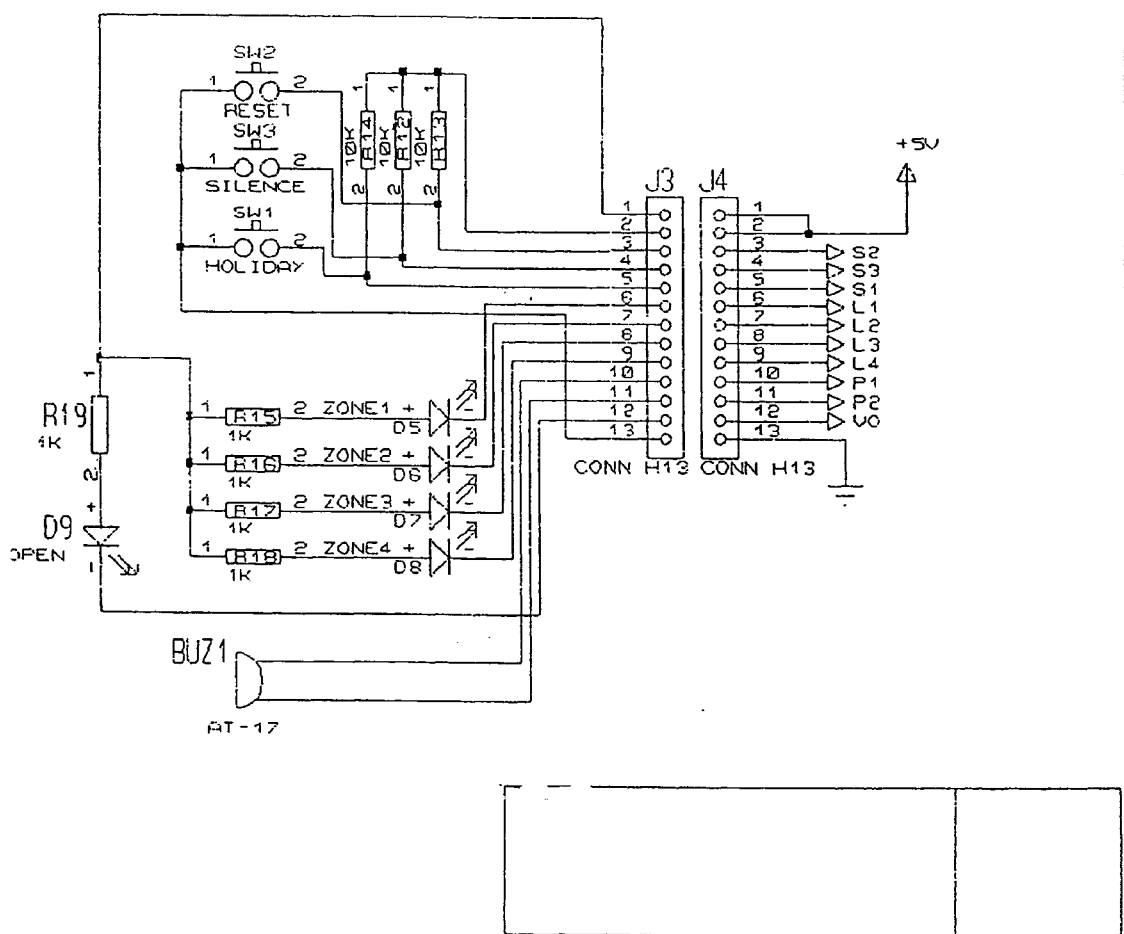
FIG. 20 illustrates an electronic circuit diagram of a relatively simple liquid and/or gas leak detection system, suitable for a residential building.

FIG. 20 illustrates an electronic circuit diagram of a relatively simple liquid and/or gas leak detection system, suitable for a residential building. Thus FIG. 20 can be understood readily by a person skilled in the art when reviewed in association with the discussion about the process which appears later in this description.

Figure 21A:
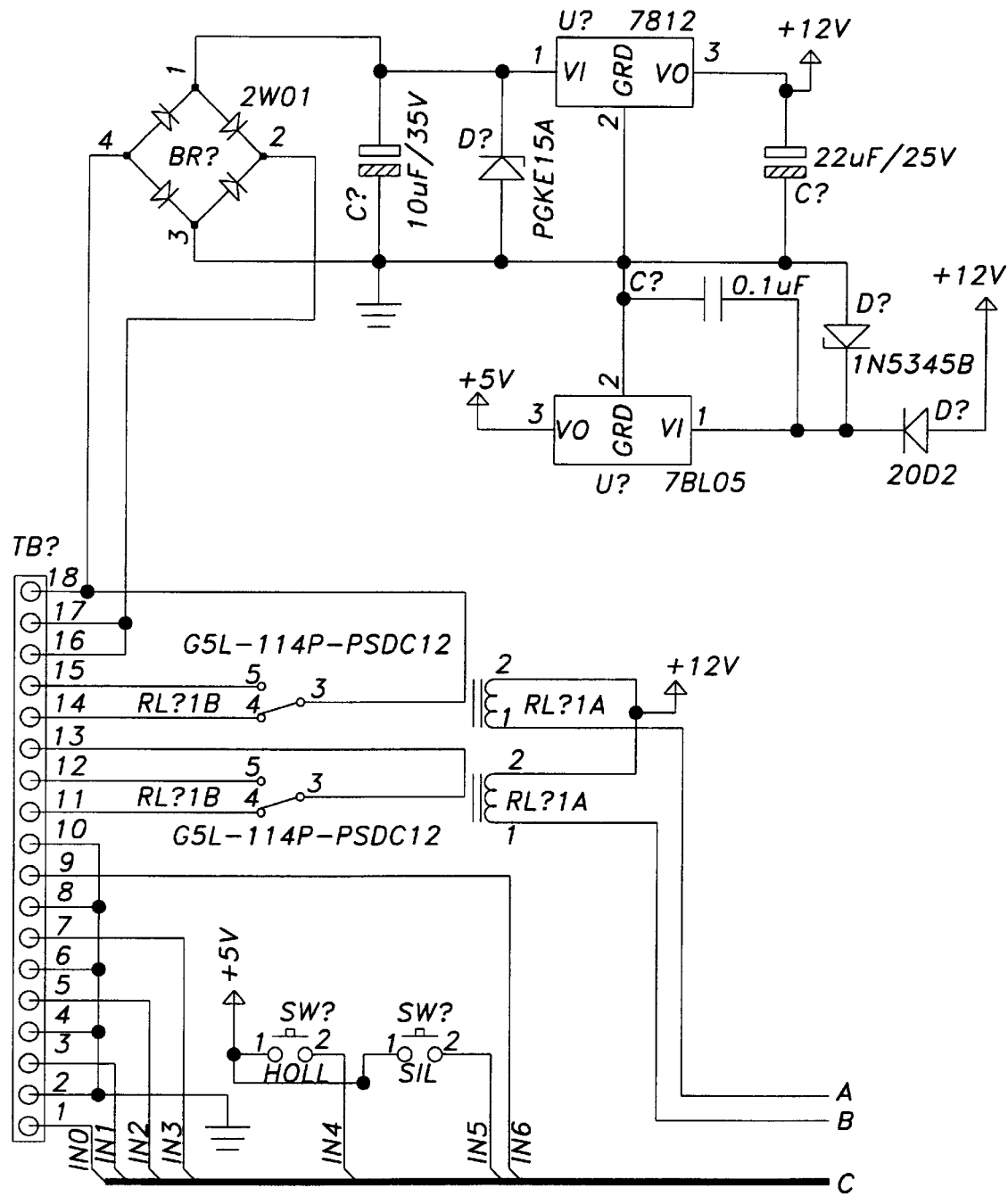
FIGS. 21A & 21B illustrates an electronic circuit diagram of a more complex liquid and/or gas leak detection system, suitable for a multiple residential building, an office building or some other multiple occupancy or multiple use building.
Figure 21B:
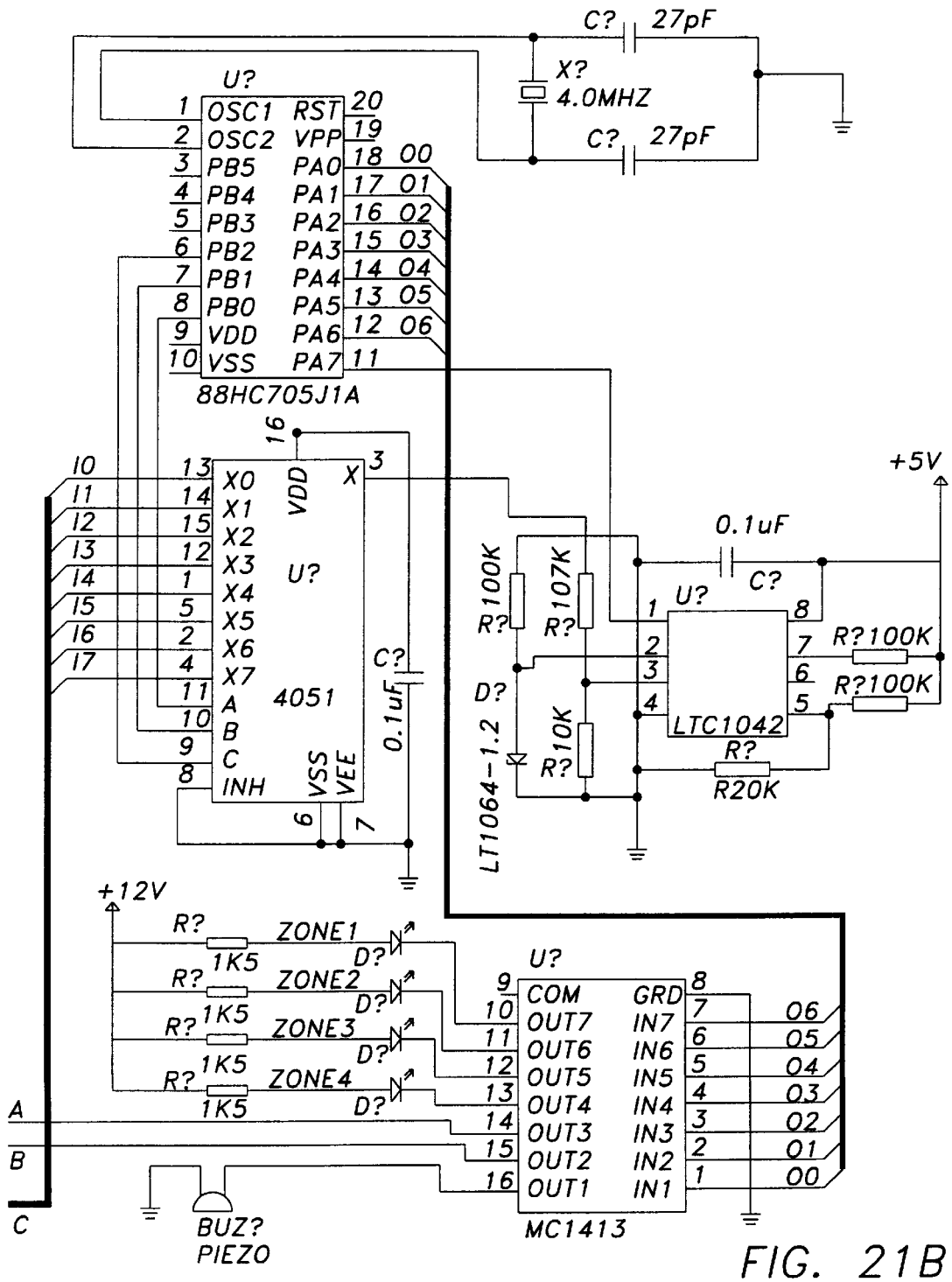

FIG. 21A and 21B illustrates an electronic circuit diagram of a more complex liquid and/or gas leak detection system, suitable for a multiple residential building, an office building or some other multiple occupancy or multiple use building. Again, these Figures should be considered in association with the process discussion which appears later in this disclosure.

PROCESS CAPABILITIES

As will be evident from the foregoing discussion and the accompanying drawings, the invention provides a versatile system with a number of valuable capabilities, some of which are repeated below. The invention provides an ability to sense the presence or absence of liquids such as water, fuel oil or gasoline, and/or gases such as natural gas or carbon monoxide, and to cause an associated reaction in the form of a change in the flow rate and/or flow direction and/or pressure of the liquids and/or gases through the use of appropriate electronic and electro-mechanical devices. In addition, the invention has an ability to electronically enunciate all conditions and changes in conditions, as detected by the detector system.

The invention also is highly versatile because it includes a capacity to transmit the water or gas sensory data with respect to the presence or absence of liquids and/or gases by means of hard wired, radio frequency, power line carrier, infrared, fibre optics, and ultra sonic devices, as the case may be, utilizing varying signals including analog and digital formats and protocols and custom generated signal formats and protocols.

The invention further includes the capability to transmit data regarding the condition of the system for the purpose of off-site monitoring and enunciating by means of hard wired, radio frequency, power line carrier, infrared, fibre optics, and ultra sonic devices, and the like, utilizing varying signals including analog and digital formats and protocols.

The invention is flexible, expandable, versatile and adaptable. For example, it includes an ability to electronically and/or electrically and/or manually operate the system, to electronically and/or electrically and/or manually override and/or reset the system, and to operate utilizing alternating or direct current.

OPERATION OF INVENTION

This invention provides and apparatus and method of controlling the sourcing of directional fluids and gases and has as one advantage, monitoring of such fluids and gases. The system also has the capability to enunciate, record and control both functions simultaneously with visible and audible signals and controls. The electronic controller is designed so that it can be operated alone or other modules may be added or deleted as required to suit a wide variety of single and multiple use applications. The main function of the invention is to control the presence or absence of designated fluids or designated types of gases, that is, non-flammable fluids as well as flammable and/or a combination of same. The system is versatile because it allows one controller to expand up to and/or including over 100 responses from various monitor sources, or as few as one response. The invention includes the capability of being able to report to telephone display and/or security panels with controllable outputs up to and including 24 volts. The system can operate on either AC or DC power. In multiple use applications, the system is able to control three wire and/or 2 wire valve leads. The RF or radio frequency emitted by the transmitter, may be adapted to various types of control boards and have the versatility of employing a power line carrier, a hard wire circuit and a radio frequency, which work together as a unit. A one controller panel can be used with valve closures for gases or fluids, and can use open or closed switches for safety purposes.

The detectors used in the invention are available in the marketplace and are of a fast response type. An intelligent detector (computer) is not required as the central control is microprogrammed to respond to a wide variety of conditions and demands. Directional detectors can be used in cases where there is not a specific area. In that way, total control of a given environment can be achieved. Inputs and outputs with recycling control and monitoring action can be achieved by interfacing various components with each other. Computer monitoring is available as part of the invention.

The system is relatively simple and hence reliable because there are no latching pins or trip arm or counter-clockwise rotations or wire spring of Bi-metal (trade-mark) used in valve actuation. Compare, for example, U.S. Pat. No. 5,240,022, Franklin. An electronic mechanical valve is used that does not require a manual reset. A relay or contact switch can be used for that purpose. Power requirements are low because power is not required to turn off the valve or to reopen it. There is a manual override for these instances. Power is also not required to maintain the valve in a normal open position. Power is required only when closing the valve which can also be done manually. Power back up (eg. battery) can also be installed. However, back up is usually required only in isolated installations where access to power is not available.

The invention in one embodiment uses fail-safe valves from Honeywell Inc. These automatically close on power failure and are reopened when power supply is re-established. When power supply is terminated, manual over-ride can be used.

Functional Description of a Typical SVC Components Installation

Some of the various components illustrated in the drawings which were discussed previously are listed below.

Control Inputs

1. Main Power—24VAC@5A
2. Three SPST momentary contact switches—Holiday, Silence, Reset
3. Five water sensor inputs
4. One override input-fire sensor System Outputs 1. Valve (common)
2. Valve open—optional
3. Valve close—optional
4. Five current loop outputs
5. One SPDT auxiliary output—Com, NC, NO
6. Five L.E.D. indicators
7. One piezo alarm sounder Operation On power up, the system is designed so that the microprocessor will perform an automatic power up reset. This sets the system in a "ready" state. FIGS. 20 and 21 illustrate typical electronic circuits for performing the objectives of the invention. Once the power up reset sequence has been completed, the system begins to scan all of its inputs from the various sensors, whether there be one or many. Usually, there will be many sensors, both fluid and gas. If an input is in an alarm condition, the system will automatically close both relays which then close the appropriate valve, turn on the "Valve Closed L.E.D." on the control panel and switch the auxiliary output. The system will then activate the appropriate "Zone L.E.D." and the piezo alarm sounder. This set of conditions will persist until the "Reset" button is pressed (with the exception of the sounder which can be silenced by pressing the "Silence" switch). If one or more of the zones goes into alarm when the override input is active, the Zone L.E.D.'s and Piezo alarm sounder will be turned on, but the valve will not be closed.

Product Breakdown

Controller

In order to interface the liquid and/or gas sensors to the electro-mechanical control with respect to change in the flow rate and/or flow direction and/or pressure of the liquids and/or gases, to a specific environment, that is, single family residence, multiple use building or other variations, controllers are built in various designs and configurations. In a basic form, the controller will interpret input signals from the sensors (water or gas) and by transmitter cause a receiver output signal to control the change in state of the electro-mechanical device (motor-valve) regulating the source of the fluid or gas. Simultaneous output signals can be transmitted by the controller in analog and digital forms for control of additional associated devices and to provide output signals to other controllers provided by others. The input and output signals to and from the controller can be transmitted in simplex or duplex form by a variety of means such as hard wire, radio frequency, power line carrier, infrared, fibre optic, or ultra sonic mediums, utilizing varying signals including analog and digital formats and protocols including public knowledge protocols and custom generated signal formats and protocols.

Sensors

In order to sense the presence or absence of unwanted liquids and gases, various market available sensory devices can be utilized. These sensors provide an analog or digital output signal when a stray liquid or gas is sensed. This signal is transmitted to the controller.

Electro-mechanical Device

To change the flow rate and/or flow direction and/or pressure of the liquids and/or gases, or stop them completely, an electro-mechanical flow control device which is regulated by a signal from the controller is utilized. Such an electro-mechanical device can be of various configurations including solenoid and motor controlled valves, gates, diaphragms, shutters, nozzles, restrictors, enlargers, and any other mechanical device which can be electrically motivated to change or stop the flow rate and/or flow direction and/or pressure of the liquids and/or gases.

Description of a Typical Liquid Sensing System

A liquid sensor in the form of an open circuit is placed near the liquid source, typically water. When liquid leaks across the sensor, the circuit is closed, thereby allowing electrical current originating from the controller to pass freely through the circuit. This causes an associated electronic relay to latch close. This in turn causes current to pass to an electro-mechanical valve which is designed to close when current is applied to it. The closed valve shuts off the sources of the liquid. Once the liquid withdraws from the sensor, it returns to an open state but the associated relay remains closed until it is manually reset. Resetting opens the circuit which removes current from the electro-mechanical valve. The valve will then either be automatically and/or manually reopened.

Description of a Typical Gas System

A market available gas sensor (natural gas, propane or carbon monoxide) in the form of an intelligence device which contains its own logic and sensory circuits is placed in the environment where escaped gas may be present. An associated output signal from the sensor is in a neutral state. When unwanted gas is detected by the sensor, an output signal is activated and transmitted to the controller where it is interpreted and causes an associated relay to latch close. This causes current to pass to an electro-mechanical valve, which regulates the source of the gas, and is designed to close when current is applied. Once the gas is dissipated from the sensor, it returns its output signal to a neutral state and the associated relay remains closed until it is manually reset. Resetting opens the circuit which removes current from the electro-mechanical valve. The valve will then either be automatically and/or manually reopened.

Controller Types

The controller is comprised of various commercially available models with expansion capability available to suit a wide variety of applications and various liquids or gases. Four typical controller systems are discussed below.

1. A first type of controller (I) is a liquid and/or gas directional controller that can simultaneously sense gases, i.e. carbon monoxide and fluids, and activate an electro-mechanical valve. At the same time, the controller actuates a relay closing valve (24 volt AC), and a second relay which on the detection of fluids or gases activates the alarm on the control panel (5 volt DC) and simultaneously activates a normally open or normally closed contact which then shuts down the source of the gas.

2. A second type of controller (II) has the same types of controls as (1) above, but is expanded to include radio frequency or 2 or 3 wire fail safe applications. Further expansion can be made to include electro-mechanical valve with manual override consisting of auto recycle ability system check and/or unlimited gases and/or fluids with ability to sense gases and/or lack of same.

3. The third type of controller (III) has a capability to handle hardwire, radio frequency and power line, infrared, fibre optics and ultra sound simultaneously. Expansion is possible to a virtually unlimited number of inputs and outputs with proportionate degrees of power application.

4. The fourth type of controller (IV) is an amalgamation of and has all characteristics of controller I, II and III, including microprocessor and liquid display crystals. The controller (IV) includes remote radio sensor with accessories for both liquid and gas and is adaptable to various power sources.

| SVC24-4 "SMART VALVE" Control ("SMART VALVE" is a trade-mark.) | |
| --- | --- |
| Number of zones | from 1 to 100 |
| Primary voltage | 100 to 130 VAC, 50/60 Hz |
| Secondary voltage | 24 VAC, 50/60 Hz or 12 Volt-DC |
| Current drain | Standby, 150 Ma. During alarm, 550 Ma. |
| Nominal timing | Valve opens in 6 seconds |
| Auto test cycle | Approx. every 21 days - programmable |
| Temperature | operating, 0 to 65° C. (−32 to 150° F.) |
| Distance to sensor | Unlimited |
| Termination | Screw type terminals |

-continued

SV "SMART VALVE"

| | |
|---|---|
| Voltage | Low voltage (open range) AC or DC |
| Power consumption | 6 watts max. |
| End switch rating | 2.2 A inductive |
| Nominal timing | Valve opens in 6 seconds |
| Operating pressure | Max. - 4 Bar (60 psi) |
| Pressure rating | Static - 20 Bar (360 psi) |
| | Burst - 100 Bar (1500 psi) |
| Valve material | Bronze, Ryton and Noryl |
| Dimensions/Pipe sizes | Optional |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A liquid or gas leak detection and control apparatus comprising:

(a) a plurality of liquid or gas detectors for detecting liquid or gas;

(b) a transmitter electronically associated with each liquid or gas detector in said plurality of liquid or gas detectors, said transmitter, when activated by an electronic signal by said liquid or gas detector detecting liquid or gas, transmitting audio or radio signals or electrical signals by wire to a receiver;

(c) said receiver for receiving said audio or radio signals or electrical signals by wire transmitted by said transmitter and activating a control mechanism;

(d) a control mechanism associated with the receiver, said control mechanism, when activated by an electronic signal from the receiver, activating a shut-off valve associated with said liquid or gas detector which controls an associated source of the liquid or gas; and (e) a power supply for electrically powering each detector, transmitter, receiver and control mechanism, wherein said plurality of liquid or gas detectors are located in separate locations in a network including a central control which electronically communicates with said plurality of liquid or gas detectors, transmitters and receivers and controls valves that regulate the sources of liquid or gas, and wherein said plurality of liquid or gas detectors are remote from said central control and said control valves are independently remotely actuable between open and closed positions in response to said communication from said central control.

2. An apparatus as claimed in claim 1 including a plurality of water detectors deployed throughout a building, and a plurality of connecting transmitters deployed throughout the building, the transmitters communicating with respective receivers and motors, which are connected to a plurality of respective water valves which regulate the respective sources of water which may contact the respective water detectors, the respective applicable motors independently shutting off applicable water valves.

3. An apparatus as claimed in claim 1 including a plurality of gas detectors deployed through a building, and a plurality of connecting transmitters deployed throughout the building, the transmitters communicating with respective receivers and motors, which are connected to a plurality of respective gas valves which regulate the sources of gas which may contact the respective gas detectors, the respective applicable motors shutting off applicable gas valves.

4. An apparatus as claimed in claim 2 including a plurality of gas detectors deployed throughout a building, and a plurality of connecting transmitters deployed throughout the building, the transmitters communicating with respective receivers and motors, which are connected to a plurality of respective gas valves which regulate the sources of gas which may contact the respective gas detectors, the respective applicable motors shutting off applicable gas valves.

5. The apparatus as claimed in claim 1 wherein multiple input zones control one or more valves.

6. The apparatus as claimed in claim 1 wherein said control mechanism changes flow rate, flow direction or flow pressure whereby a flow may be adjusted to compensate for an isolated leak.

* * * * *